United States Patent
Ikeda

(10) Patent No.: US 12,270,453 B2
(45) Date of Patent: Apr. 8, 2025

(54) SHOCK ABSORBER AND SADDLE-TYPE VEHICLE

(71) Applicant: Hitachi Astemo, Ltd., Hitachinaka (JP)

(72) Inventor: Daisuke Ikeda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 712 days.

(21) Appl. No.: 17/546,205

(22) Filed: Dec. 9, 2021

(65) Prior Publication Data

US 2022/0097796 A1     Mar. 31, 2022

Related U.S. Application Data

(63) Continuation of application No. PCT/JP2019/029994, filed on Jul. 31, 2019.

(51) Int. Cl.
| | |
|---|---|
| *F16F 9/44* | (2006.01) |
| *F16F 9/348* | (2006.01) |
| *B62K 25/28* | (2006.01) |

(52) U.S. Cl.
CPC ............ *F16F 9/44* (2013.01); *F16F 9/348* (2013.01); *B62K 25/283* (2013.01);
(Continued)

(58) Field of Classification Search
CPC ........ F16F 9/36; F16F 9/44; F16F 9/46; F16F 9/348; F16F 2222/12; F16F 2228/066;
(Continued)

(56) References Cited

U.S. PATENT DOCUMENTS

| 12,077,242 B2 * | 9/2024 | Ikeda ..................... F16F 9/348 |
| 2010/0018818 A1 * | 1/2010 | Ishii ........................ F16F 9/065 188/319.1 |

(Continued)

FOREIGN PATENT DOCUMENTS

| DE | 112018008004 T5 | 6/2021 |
| JP | 2857403 B2 | 2/1999 |

(Continued)

OTHER PUBLICATIONS

German Office Action mailed Oct. 30, 2023 for the corresponding German Patent Application No. 112019007310.9 (6 pages including English translation).

(Continued)

*Primary Examiner* — Christopher P Schwartz
(74) *Attorney, Agent, or Firm* — Leason Ellis LLP; Edward J. Ellis; Melvin C. Garner

(57) ABSTRACT

A shock absorber includes a first damping force generating portion which is fixed to a first end portion of a cylinder in an axial direction thereof, a second damping force generating portion which is disposed to be movable in the axial direction in the cylinder. The second damping force generating portion includes a first flow path which passes through a piston in the axial direction, the piston partitioning a space inside the cylinder, a first valve which opens and closes the first flow path, a first adjustment unit which adjusts a force required to open the first valve, a second flow path which is located at a different position from the first flow path and passes through the piston in the axial direction, a second valve which opens and closes the second flow path, and a second adjustment unit which adjusts a force required to open the second valve.

20 Claims, 9 Drawing Sheets

(52) U.S. Cl.
CPC ..... *F16F 2222/12* (2013.01); *F16F 2228/066* (2013.01); *F16F 2230/186* (2013.01); *F16F 2232/08* (2013.01); *F16F 2234/02* (2013.01)

(58) Field of Classification Search
CPC ............. F16F 2230/186; F16F 2232/08; F16F 2234/02; B62K 25/283
USPC ........................... 188/313, 314, 318, 322.13
See application file for complete search history.

(56) References Cited

U.S. PATENT DOCUMENTS

| | | |
|---|---|---|
| 2017/0058987 A1 | 3/2017 | Nakano |
| 2017/0284495 A1 | 10/2017 | Matsumoto |
| 2021/0253194 A1 | 8/2021 | Morishita |
| 2022/0097794 A1* | 3/2022 | Ikeda ..................... B62K 25/08 |

FOREIGN PATENT DOCUMENTS

| | | | |
|---|---|---|---|
| JP | 2017044240 A | 3/2017 | |
| JP | 2017180801 A | 10/2017 | |

OTHER PUBLICATIONS

International Search Report mailed Aug. 27, 2019 for the corresponding International Patent Application No. PCT/JP2019/029994.

* cited by examiner

_SHOCK ABSORBER AND SADDLE-TYPE VEHICLE_

CROSS-REFERENCE TO RELATED APPLICATION(S)

This application is a continuation of PCT application No. PCT/JP2019/029994, which was filed on Jul. 31, 2019, the content of which is incorporated herein by reference in its entirety.

FIELD OF THE INVENTION

The present invention relates to a shock absorber and a saddle-type vehicle.

BACKGROUND OF THE INVENTION

In recent years, a technique for improving damping characteristics when a piston moves at a high speed in a cylinder of a shock absorber and oil flows at a high speed has been proposed.

For example, a shock absorber disclosed in JP-A-2017-180801 includes a holding member which is provided at an opposite side to a piston rod relative to a piston, and holds an outer cylinder and an inner cylinder in a state in which an end portion at one end side of the outer cylinder is disposed at a side where the piston rod is disposed, from an end portion of the inner cylinder at the one end side. The holding member includes a damper accommodating portion which accommodates a damping force generating portion, a first communication passage which allows an inner side of the inner cylinder and the damper accommodating portion to communicate with each other, a second communication passage which allows a gap and the damper accommodating portion to communicate with each other, and a flow path opening portion which is formed at an opposite side to the piston rod relative to an end portion of the outer cylinder and allows the second communication passage and the gap to communicate with each other.

The damping force generating portion of the shock absorber disclosed in JP-A-2017-180801 has a function of adjusting a damping force in a low speed range in which the piston moves at a low speed. However, in the shock absorber disclosed in JP-A-2017-180801, an adjustment of a damping force in a medium speed range in which the piston moves at a medium speed faster than the low speed, or in a high speed range in which the piston moves at a high speed faster than the medium speed can be further improved.

An object of the present invention is to provide a shock absorber and the like which can adjust a damping force over a large moving speed range of a piston.

SUMMARY OF THE INVENTION

Hereinafter, the present disclosure will be described. In the following description, reference numerals in the accompanying drawings are added in parentheses to facilitate understanding of the present disclosure, but the present disclosure is not limited to the following embodiments.

According to a first aspect of the present disclosure, there is provided a shock absorber (1, 3). The shock absorber (1, 3) includes a first damping force generating portion (40) which is fixed to a first end portion (1it) of a cylinder (11) in an axial direction thereof, and a second damping force generating portion (100, 300) which is disposed to be movable in the axial direction in the cylinder. The second damping force generating portion includes a first flow path (121) which passes through a piston (92) in the axial direction, the piston (92) partitioning a space inside the cylinder, a first valve (131) which opens and closes the first flow path, a first adjustment unit (140) which adjusts a force required to open the first valve, a second flow path (122) which is located at a different position from the first flow path and passes through the piston in the axial direction, a second valve (132) which opens and closes the second flow path, and a second adjustment unit (160) which adjusts a force required to open the second valve.

Here, the first end portion (11t) of the cylinder (11) may be disposed at a vehicle body side. The shock absorber may further include a rod (93) which holds the piston (92) at an end portion (93t) of the rod at a first end portion side, an end portion (93b) of the rod at a second end portion (11b) side being disposed at a wheel side, the second end portion side being an opposite side to the first end portion in the axial direction of the cylinder. The first valve (131) may open and close an opening portion at the second end portion side of the first flow path (121), and the second valve (132) may open and close an opening portion of the second flow path (122) at the second end portion side.

The first valve (131) may open the first flow path (121) when a pressure of a chamber (S1) at a first end portion side is equal to or higher than a first pressure (P1), the chamber (S1) at the first end portion (1it) side being defined by the piston (92) in the cylinder (11), and the second valve (132) may open the second flow path (122) when a pressure of a chamber at the first end portion side is equal to or higher than a second pressure (P2) which is higher than the first pressure.

The first damping force generating portion (40) may generate a damping force even when the pressure of the chamber (S1) at the first end portion (11t) side is lower than the first pressure (P1).

The first adjustment unit (140) may include a first spring (141) which applies a force in a closing direction to the first valve (131), a first spring receiver (142) which supports an end portion (141b) at the second end portion (11b) side of the first spring, and a first adjustment portion (150) which adjusts a position of the first spring receiver. The second adjustment unit (160) may include a second spring (161) which applies a force in a closing direction to the second valve (132), a second spring receiver (162) which supports an end portion (161b) at the second end portion side of the second spring, and a second adjustment portion (170) which adjusts a position of the second spring receiver.

The second spring (161) may be disposed to surround the first spring (141).

The second damping force generating portion (300) may further include a third flow path (223) which passes through the rod (93) holding the piston (92), and a third valve (233) which opens and closes the third flow path.

The first adjustment unit (140) may adjust a force required to open the first valve (131) and a force required to open the third valve (233).

According to a second aspect of the present disclosure, there is provided a shock absorber (2). The shock absorber (2) includes a first damping force generating portion (40) which is fixed to a first end portion (11t) of a cylinder in an axial direction thereof, and a second damping force generating portion (200) which is disposed to be movable in the axial direction in the cylinder. The second damping force generating portion includes a first flow path (121) which passes through a piston (92) in the axial direction of the piston (92) partitioning a space inside the cylinder, a first valve (131) which opens and closes the first flow path, a second flow path (122) which is located at a different position from the first flow path and passes through the piston in the axial direction, a second valve (132) which opens and closes the second flow path, and a third flow path (223) which passes through a rod (93) holding the piston, a third valve (233) which opens and closes the third flow path, a first adjustment unit (140) which adjusts a force required to open the third valve, and a second adjustment unit (160) which adjusts a force required to open the second valve.

Here, the first end portion (11*t*) of the cylinder (11) may be disposed at a vehicle body side. The rod (93) may hold the piston (92) at an end portion of the rod at a first end portion side, and an end portion of the rod (93) at the second end portion (11*b*) side may be disposed at a wheel side, the second end portion side being an opposite side to the first end portion in the axial direction of the cylinder. The first valve (131) may open and close an opening portion of the first flow path (121) at the second end portion side, the second valve (132) may open and close an opening portion of the second flow path (122) at the second end portion side, and the third valve (233) may open and close an opening portion of the third flow path (223) at the second end portion side.

The first valve (131) may open the first flow path (121) when a pressure of a chamber (S1) at the first end portion (11*t*) side is equal to or higher than a first pressure (P1), the chamber (S1) at the first end portion (11*t*) side being defined by the piston (92) in the cylinder (11), and the second valve (132) may open the second flow path (122) when a pressure of the chamber at the first end portion side is equal to or higher than a second pressure (P2) which is higher than the first pressure.

According to a third aspect of the present disclosure, there is provided a saddle-type vehicle (10). The saddle-type vehicle (10) includes a vehicle body (4), a front wheel (5) disposed at a front side of the vehicle body in a traveling direction, a rear wheel (6) disposed at a rear side in the traveling direction, a first shock absorber (7) disposed between the vehicle body and the front wheel, and a second shock absorber (1, 2, 3) disposed between the vehicle body and the rear wheel. At least the second shock absorber is any one of the shock absorber (1, 2, 3) described above.

According to the present invention, it is possible to provide a shock absorber or the like which can adjust a damping force over a large moving speed range of a piston.

DETAILED DESCRIPTION OF THE INVENTION

Hereinafter, embodiments will be described in detail with reference to the accompanying drawings. The present invention is not limited to the following embodiments.

First Embodiment

Figure 1:
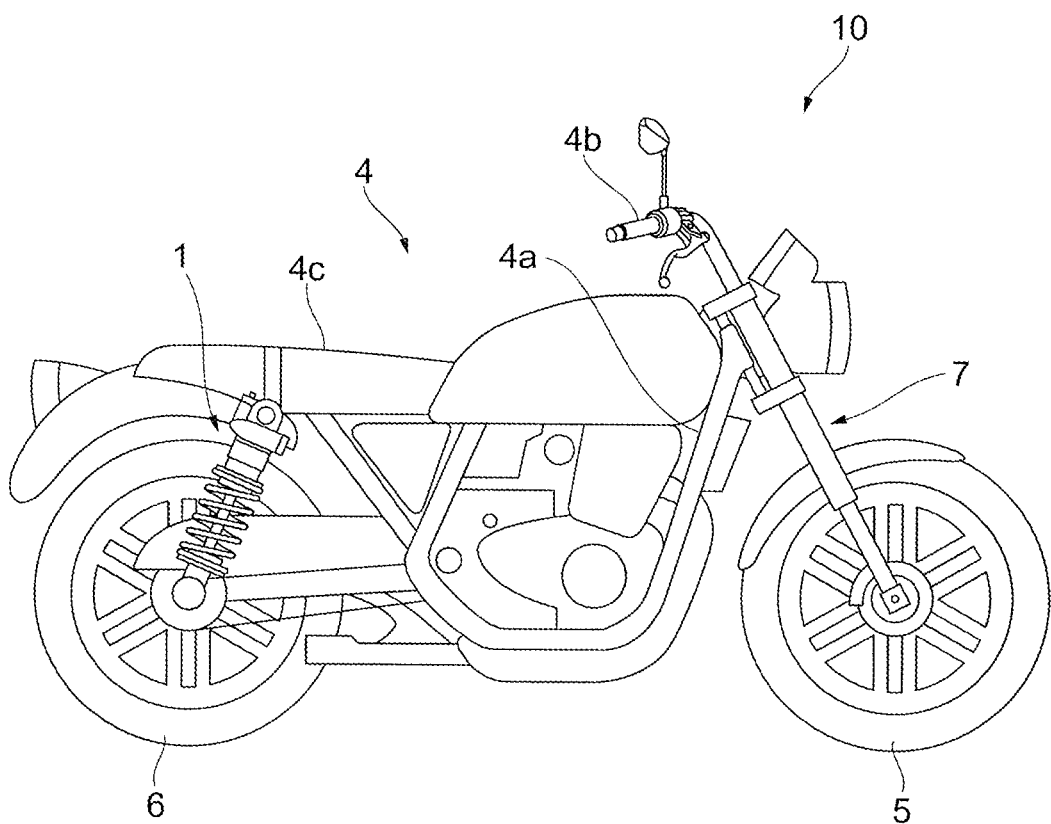
FIG. 1 is a diagram illustrating an example of a schematic configuration of a saddle-type vehicle 10.

FIG. 1 is a diagram illustrating an example of a schematic configuration of a saddle-type vehicle 10.

The saddle-type vehicle 10 includes a vehicle body 4, a front wheel 5 disposed at a front side of the vehicle body 4 in a traveling direction, and a rear wheel 6 disposed at a rear side in the traveling direction. The vehicle body 4 includes a vehicle body frame 4*a*, a handle 4*b*, and a seat 4*c* which form a framework of the saddle-type vehicle 10.

The saddle-type vehicle 10 includes a first shock absorber 7 disposed between the vehicle body 4 and the front wheel 5, and a second shock absorber 1 disposed between the vehicle body 4 and the rear wheel 6. In the following description, the second shock absorber 1 may be simply referred to as a "shock absorber 1".

Figure 2:
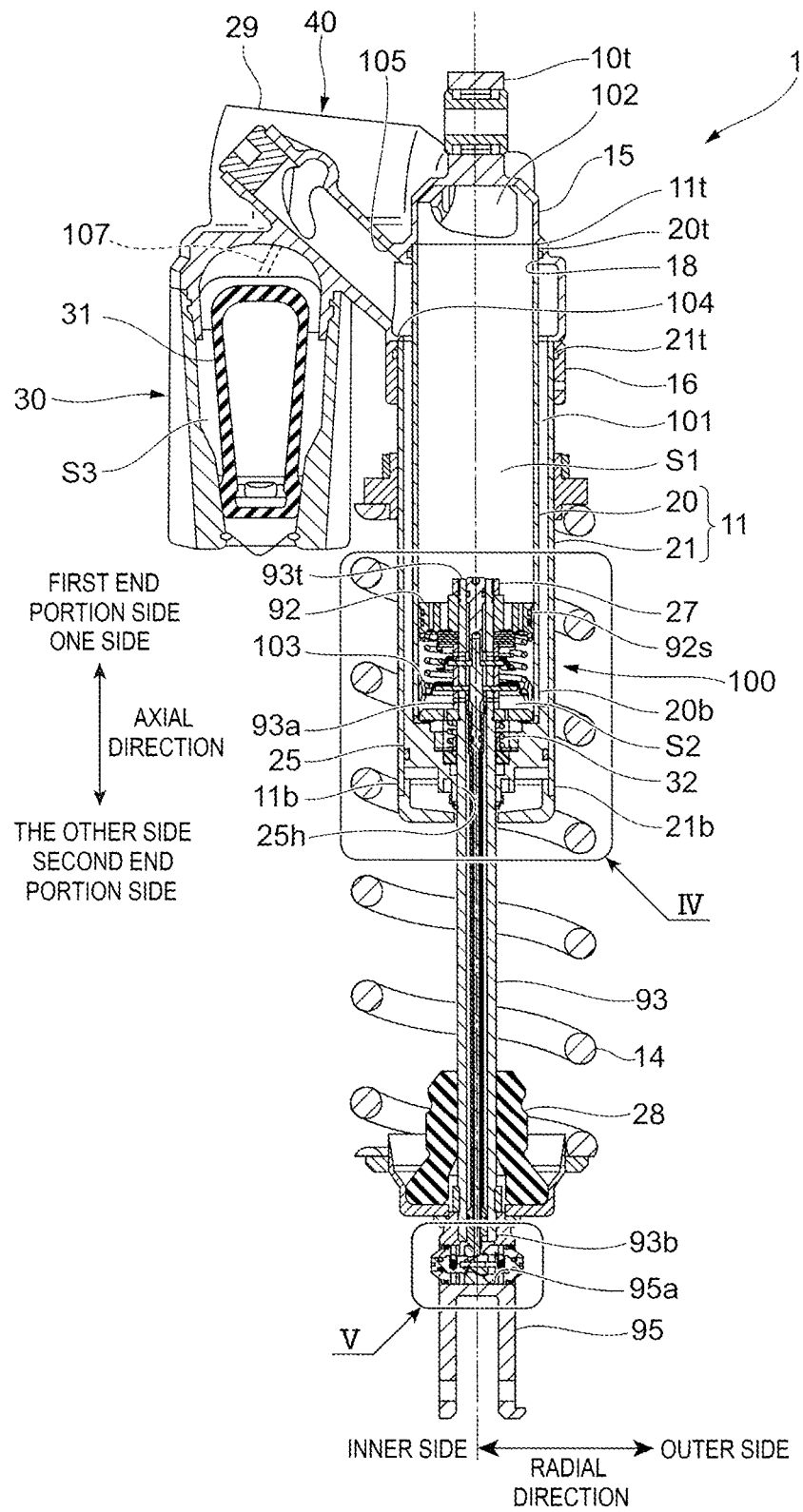
FIG. 2 is a diagram illustrating an example of a schematic configuration of a shock absorber 1 according to a first embodiment.

FIG. 2 is a diagram illustrating an example of a schematic configuration of the shock absorber 1.

Figure 3:
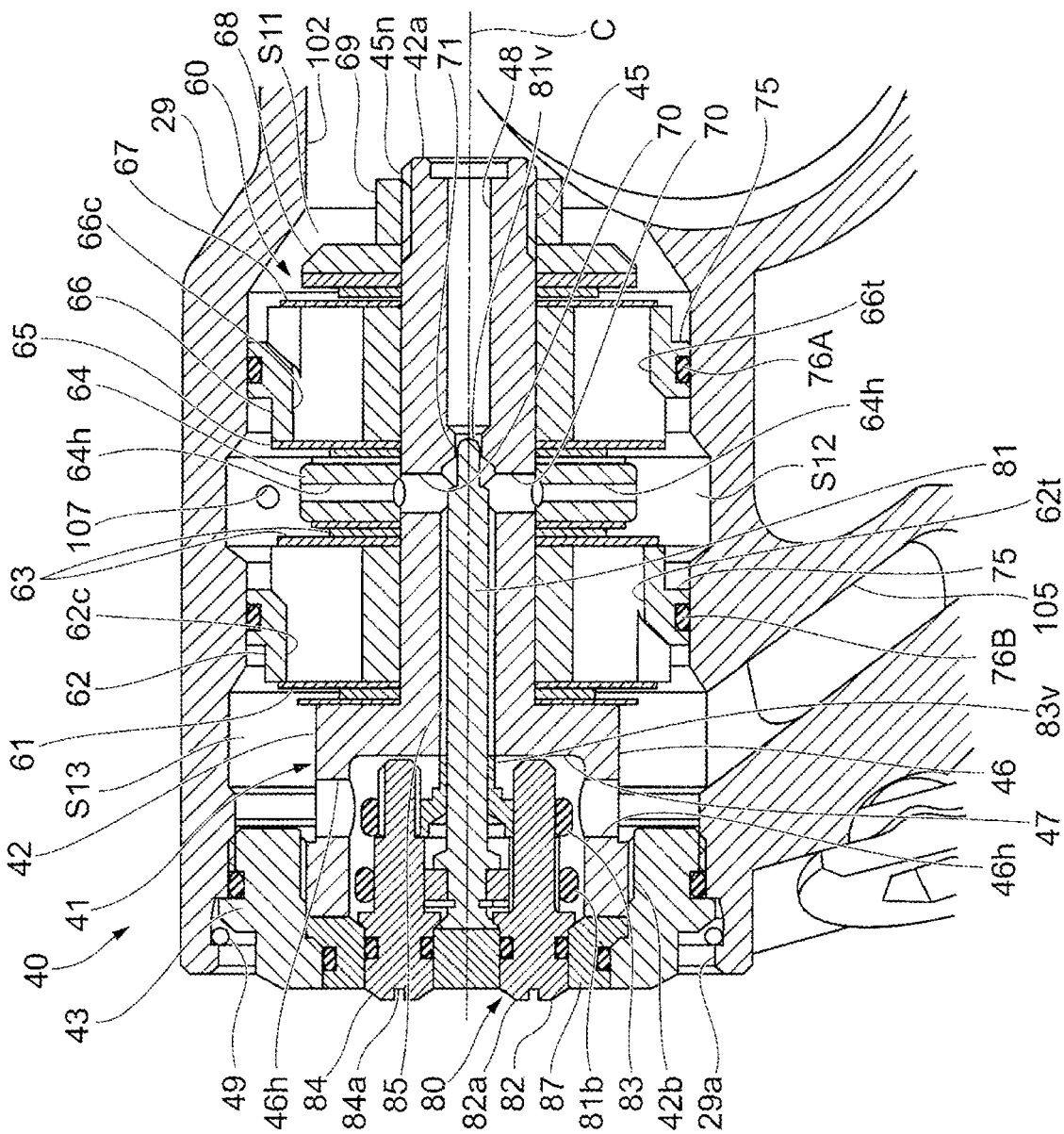
FIG. 3 is a diagram illustrating an example of a cross section of a damping force generating device 40.

FIG. 3 is a diagram illustrating an example of a cross section of a first damping force generating device 40 provided in the shock absorber 1.

A schematic configuration of the shock absorber 1 and the first damping force generating device 40 will be described with reference to FIGS. 2 and 3.

The shock absorber 1 is a device which is provided between a vehicle body and a rear wheel of a saddle-type vehicle such as a motorcycle and buffers an impact or a vibration input from the rear wheel.

The shock absorber 1 includes a cylinder 11, a spring 14, a damper case 15, a rod guide 25, a reservoir 30, and the first damping force generating device 40. The cylinder 11, the spring 14, the damper case 15, the rod guide 25, the reservoir 30, and the first damping force generating device 40 may be the same as the cylinder 11, the spring 14, the damper case 15, the rod guide 25, the reservoir 30, and the damping force generating device 40 disclosed in JP-A-2017-180801. In the following description, members and portions of the shock absorber 1 which have the same shape and function as the shock absorber disclosed in JP-A-2017-180801 are denoted by the same reference numerals, and detailed description thereof will be omitted. In the following description, the first damping force generating device 40 may be simply referred to as a "damping force generating device 40".

In the following description, a center line direction of the cylinder 11 may be referred to as an "axial direction". Relative to the axial direction of the cylinder 11, an upper side in FIG. 2 corresponding to a first end portion side may be referred to as one side, and a lower side in FIG. 2 corresponding to a second end portion side may be referred to as the other side. Further, an inner side in a radial direction from the center line of the cylinder 11 may be referred to as an "inner side" and an outer side in the radial direction from the center line of the cylinder 11 may be referred to as an "outer side".

The shock absorber 1 further includes a piston rod 93, a piston 92 fixed to an end portion at the one side of the piston rod 93, and a mounting member 95 fixed to an end portion at the other side of the piston rod 93. The piston rod 93 is different from the piston rod disclosed in JP-A-2017-180801 in that the piston rod 93 is provided with a communication hole 93a through which an inner side and an outer side of the piston rod 93 communicate with each other. The mounting member 95 is different from the axle-side mounting member disclosed in JP-A-2017-180801 in that the mounting member 95 is provided with a through hole 95a which passes through the mounting member 95 in the radial direction at a position at the other side from the piston rod 93. The piston 92 is also different from the piston disclosed in JP-A-2017-180801. The piston 92 will be described in detail later.

The shock absorber 1 further includes a second damping force generating device 100. The second damping force generating device 100 is a device which is not provided in the shock absorber disclosed in JP-A-2017-180801. The second damping force generating device 100 will be described in detail later.

Hereinafter, a configuration of the shock absorber 1 will be described in detail.

The cylinder 11 includes an inner cylinder 20 and an outer cylinder 21.

An upper end portion 20t of the inner cylinder 20 is inserted into and held by an inner cylinder holding recessed portion 18 formed in the damper case 15. An upper end portion 21t of the outer cylinder 21 is inserted into and held by an outer cylinder holding portion 16 provided in the damper case 15.

The rod guide 25 is provided inside a lower end portion 21b of the outer cylinder 21. The rod guide 25 is formed with an insertion hole 25h through which the piston rod 93 is inserted, and the piston rod 93 is guided so as to be slidable in the axial direction. The rod guide 25 closes an annular flow path 101 between the inner cylinder 20 and the outer cylinder 21. A rebound spring 32 is provided inside the rod guide 25.

The piston 92 is connected to an upper end portion 93t of the piston rod 93 by a nut 27. The piston 92 is provided inside the inner cylinder 20 of the cylinder 11 so as to be slidable along the axial direction of the inner cylinder 20 together with the piston rod 93. The piston 92 includes a seal member 92s on an outer circumferential surface. The seal member 92s seals a gap between the outer circumferential surface of the piston 92 and an inner circumferential surface of the inner cylinder 20 when the piston 92 is brought into contact with the inner cylinder 20 of the cylinder 11. An inner space of the inner cylinder 20 of the cylinder 11 is partitioned into an oil chamber S1 and an oil chamber S2 by the seal member 92s.

The mounting member 95 is mounted to a lower end portion 93b of the piston rod 93. A bump rubber 28 for preventing bottom striking of the shock absorber 1 is provided at the one side of the mounting member 95 and the piston rod 93 is inserted into the bump rubber 28.

The damper case 15 includes a mounting member 10t. One end of a communication passage 102 is opened and formed in the damper case 15 at a position facing an opening of the upper end portion 20t of the inner cylinder 20. The communication passage 102 allows the oil chamber S1 and an oil chamber S11 of the damping force generating device 40 to communicate with each other.

A plurality of oil holes 103 are formed in a lower end portion 20b of the inner cylinder 20 at intervals in a circumferential direction. The oil chamber S2 and the annular flow path 101 communicate with each other through these oil holes 103.

An opening portion 104 is formed in the damper case 15. A communication passage 105 which allows an oil chamber S13 of the damping force generating device 40 and the annular flow path 101 to communicate with each other is formed in continuous with the opening portion 104.

The reservoir 30 includes a bladder 31 filled with a gas such as air. In the reservoir 30, a space outside the bladder 31 serves as an oil reservoir chamber S3 and communicates with an oil chamber S12 of the damping force generating device 40 via a communication passage 107.

The oil chamber S1 and the oil chamber S2 in the cylinder 11, the annular flow path 101, the oil reservoir chamber S3 in the reservoir 30, and the damping force generating device 40 are filled with oil which is a fluid.

(Damping Force Generating Device 40)

The damping force generating device 40 is provided with a damper unit 41 which includes a holder member 42, an outer cap 43, a main damper 60, and a damping adjustment unit 80.

The holder member 42 includes a shaft-shaped portion 45 and a large diameter portion 46. The large diameter portion 46 is formed with a recessed portion 47 which is recessed from the other end 42b side toward a one end 42a side. A plurality of holes 46h which allows the recessed portion 47 and an outer side in the radial direction of the large diameter portion 46 to communicate with each other are formed in the large diameter portion 46 at intervals in the circumferential direction. A central hole 48 which allows the one end 42a and the recessed portion 47 to communicate with each other is continuously formed in the holder member 42 along a center axis C direction of the shaft-shaped portion 45.

The outer cap 43 is provided to close an opening portion 29a of a damper accommodating portion 29, and a C-ring 49 mounted to an inner circumferential surface of the opening portion 29a prevents the outer cap 43 from moving in a direction in which the outer cap 43 is removed from the damper accommodating portion 29.

The main damper 60 includes a check valve 61, a piston 62, a valve 63, an intermediate member 64, a valve 65, a piston 66, a check valve 67, and a stopper plate 68.

A plurality of ports 62t and a plurality of ports 62c are formed in the piston 62, and pass through the piston 62 in the center axis C direction.

The valve 63 is formed by stacking a plurality of disk valves.

The check valve 61 is formed of a disk valve, and is provided to close an outlet of the port 62c at the large diameter portion 46 side.

A plurality of ports 66c and a plurality of ports 66t are formed in the piston 66, and pass through the piston 66 in the center axis C direction.

The valve 65 is formed by stacking a plurality of disk valves.

The check valve 67 is formed of a disk valve, and is provided to close an outlet of the port 66t at the stopper plate 68 side.

A plurality of flow paths 64h are formed in the intermediate member 64 at intervals in the circumferential direction. A flow path 70 extending outward in the radial direction from the central hole 48 is formed in the shaft-shaped portion 45 of the holder member 42 at a position where the flow path 70 communicates with each of the flow paths 64*h* of the intermediate member 64.

The stopper plate 68 is disposed at the one end 42*a* side of the shaft-shaped portion 45 of the holder member 42 relative to the check valve 67.

A nut member 69 is screwed into a screw groove 45*n* formed in the one end 42*a* of the shaft-shaped portion 45.

The damping adjustment unit 80 includes an adjusting valve 81, an adjuster 82, an adjusting valve 83, and an adjuster 84.

A tip end portion side of the adjusting valve 81 is inserted into the central hole 48 from the recessed portion 47, and a disk-shaped end piece 81*b* in the recessed portion 47 is coupled to a base end portion side of the adjusting valve 81.

The adjusting valve 81 has an outer diameter smaller than an inner diameter of the central hole 48. Accordingly, a flow path 85 is formed between an inner circumferential surface of the central hole 48 and an outer circumferential surface of the adjusting valve 81. The adjusting valve 81 includes a valve portion 81*v* at the tip end portion side of the adjusting valve 81. A throttle portion 71 having a reduced inner diameter is formed at the one end 42*a* side of the holder member 42 from the flow path 70 in the central hole 48, and the valve portion 81*v* is inserted into the throttle portion 71.

The adjuster 82 extends into the recessed portion 47 and is fastened to the end piece 81*b*. A base portion 82*a* of the adjuster 82 is exposed to the outside from an inner cap 87. Accordingly, when the adjuster 82 is rotated from an outer side of the damper case 15, the end piece 81*b* moves forward and backward in the center axis C direction along the adjuster 82. Then, the valve portion 81*v* of the adjusting valve 81 moves forward and backward relative to the throttle portion 71, and a gap between the throttle portion 71 and the valve portion 81*v* is increased and reduced.

The adjusting valve 83 is provided in the recessed portion 47 and integrally includes a cylindrical valve portion 83*v* which extends toward an opening of the central hole 48 at the recessed portion 47 side.

The adjuster 84 extends into the recessed portion 47 and is fastened to the adjusting valve 83. A base portion 84*a* of the adjuster 84 is exposed to the outside from the inner cap 87. Accordingly, when the adjuster 84 is rotated from an outer side of the damper case 15, the adjusting valve 83 moves forward and backward in the center axis C direction. Then, the valve portion 83*v* of the adjusting valve 83 moves forward and backward relative to the opening of the central hole 48, and a gap between the valve portion 83*v* and the flow path 85 is increased and reduced.

In the damping force generating device 40 described above, a protruding wall 75 which protrudes outward in the radial direction is formed continuously in the circumferential direction on outer circumferential surfaces of the piston 62 and the piston 66. Seal rings 76A and 76B are provided on an outer circumferential surface of the protruding wall 75. Since the seal rings 76A and 76B abut against an inner circumferential surface of the damper accommodating portion 29, the seal rings 76A and 76B seal gaps between the piston 62 and the inner circumferential surface of the damper accommodating portion 29 and between the piston 66 and the inner circumferential surface of the damper accommodating portion 29.

An inner side of the damper accommodating portion 29 is partitioned into the oil chamber S11, the oil chamber S12, and the oil chamber S13 by the seal ring 76A of the piston 66 and the seal ring 76B of the piston 62.

(Second Damping Force Generating Device 100)

Figure 4:
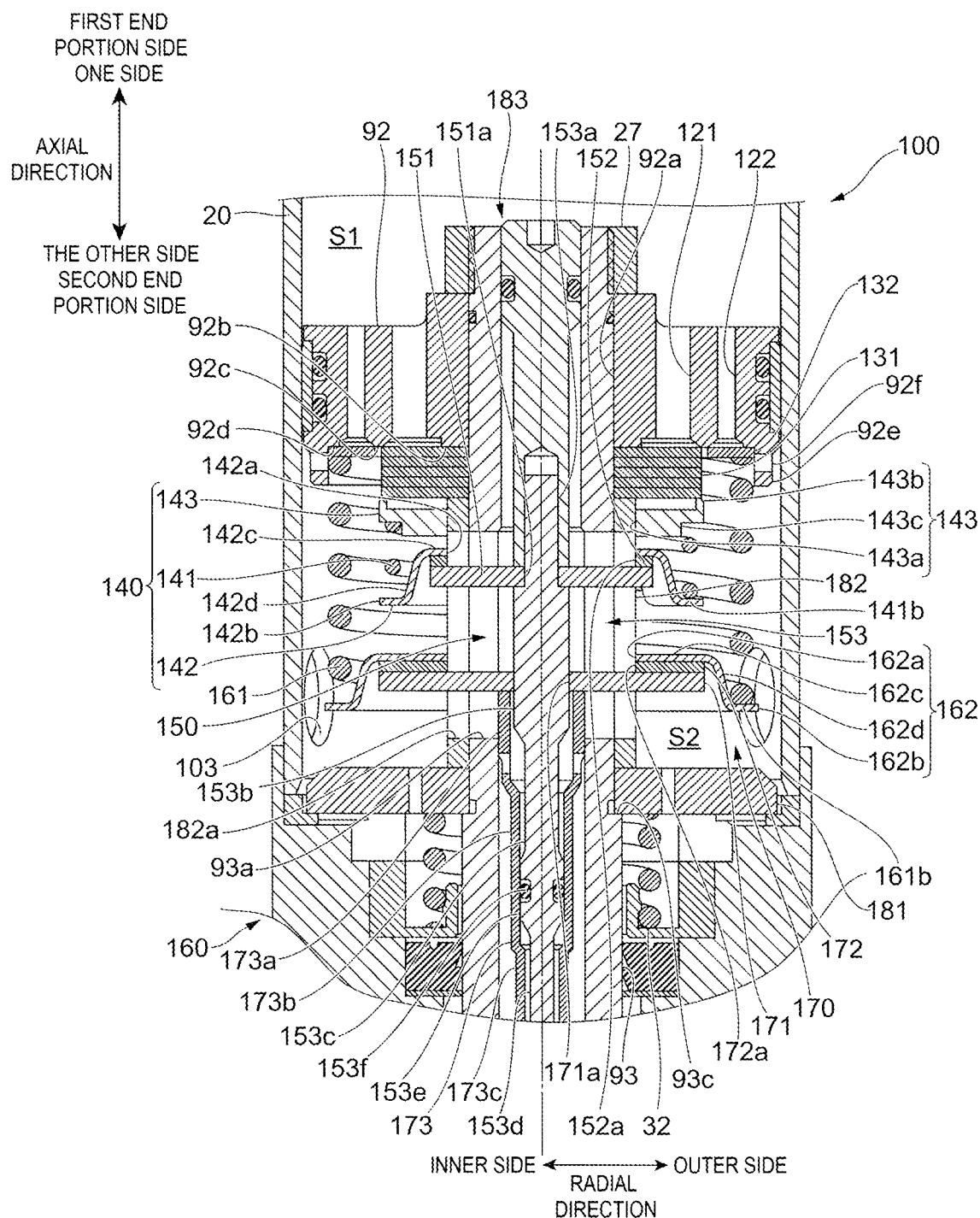
FIG. 4 is an enlarged view illustrating a portion IV in FIG. 2.

FIG. 4 is an enlarged view illustrating a portion IV in FIG. 2.

Figure 5:
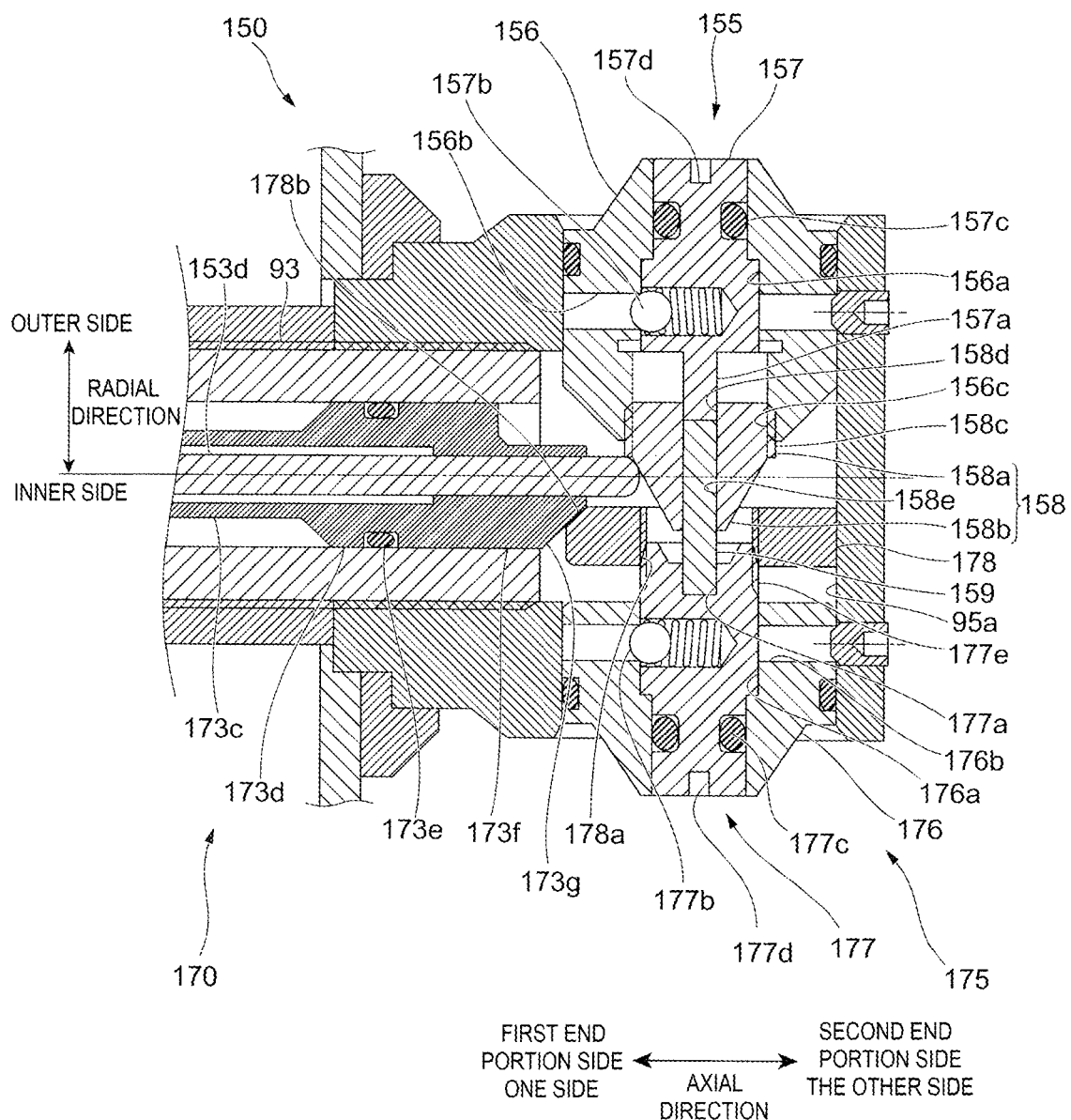
FIG. 5 is an enlarged view illustrating a portion V in FIG. 2.

FIG. 5 is an enlarged view illustrating a portion V in FIG. 2.

Figure 6:
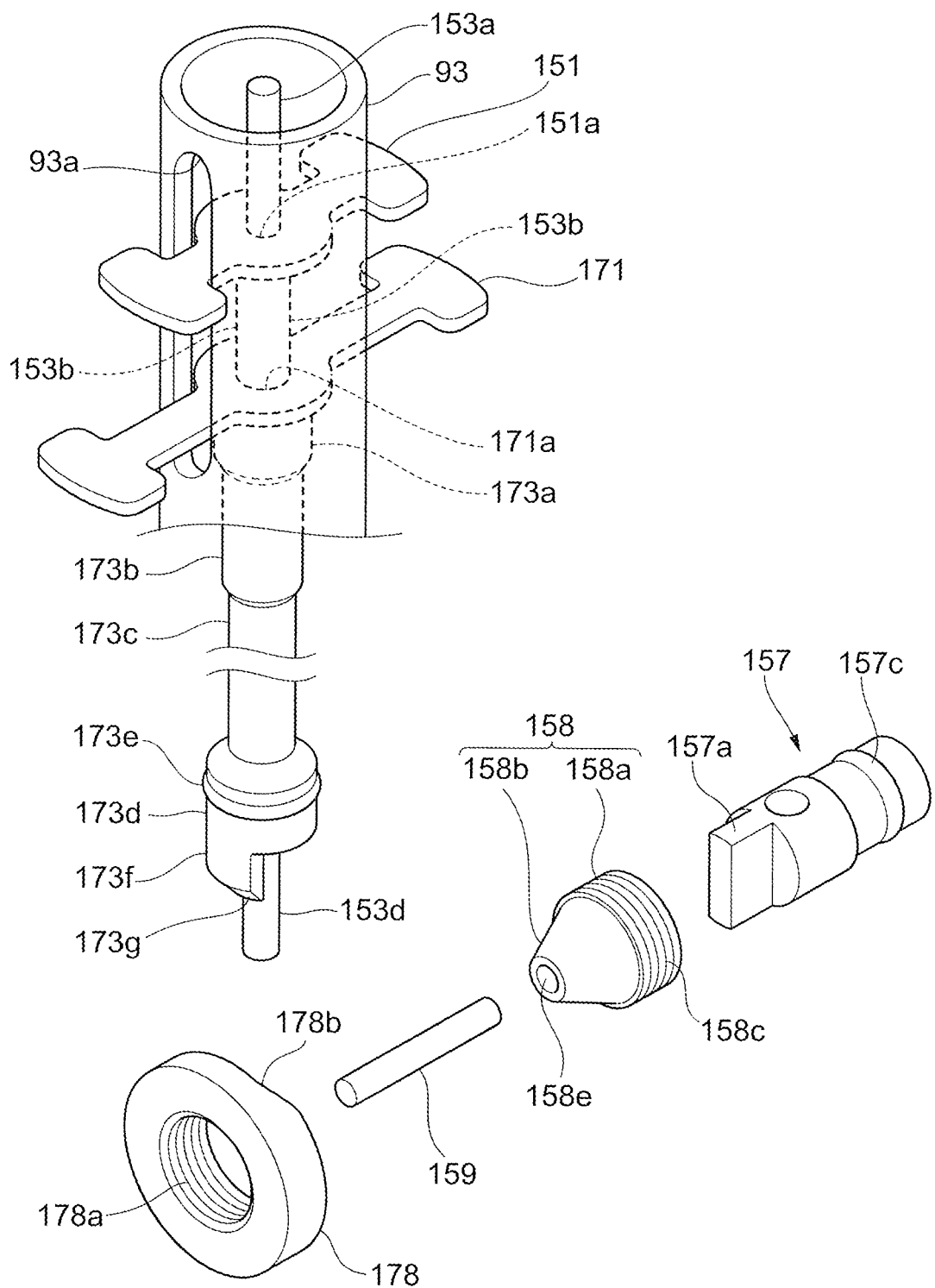
FIG. 6 is a diagram illustrating an example of a perspective view of a part of a second damping force generating device 100.

FIG. 6 is a diagram illustrating an example of a perspective view of a part of the second damping force generating device 100.

The second damping force generating device 100 will be described mainly with reference to FIGS. 4 to 6.

The second damping force generating device 100 includes a first flow path 121 which passes through the piston 92 in the axial direction of the piston 92 partitioning a space inside the cylinder 11, a first valve 131 which opens and closes the first flow path 121, and a first adjustment unit 140 which adjusts a force required to open the first valve 131.

The second damping force generating device 100 further includes a second flow path 122 which passes through the piston 92 in the axial direction at a position different from the position of the first flow path 121, more specifically, at a position outside the first flow path 121, a second valve 132 which opens and closes the second flow path 122, and a second adjustment unit 160 which adjusts a force required to open the second valve 132.

The second damping force generating device 100 includes a disk-shaped limiting member 181 which limits a movement of the piston rod 93 to the other side by abutting against the rebound spring 32 at the time of an extension side stroke in which the piston 92 moves to a wheel side in the cylinder 11 due to an upward and downward movement of the wheel. The second damping force generating device 100 includes a cylindrical collar 182 which is disposed to surround the piston rod 93 and determines a distance between the first valve 131 and the limiting member 181. A communication hole 182*a* which allows an inner side and an outer side of the collar 182 to communicate with each other is formed in the collar 182 at a position corresponding to the communication hole 93*a* of the piston rod 93. The second damping force generating device 100 includes a columnar closing member 183 which closes an opening portion at the one side of the piston rod 93. The closing member 183 is provided with a seal ring which is fitted into a groove recessed from an outer circumferential surface of the closing member 183. The seal ring seals a gap between the outer circumferential surface of the closing member 183 and an inner circumferential surface of the piston rod 93.

The piston 92, the first valve 131, the collar 182, and the limiting member 181 are interposed between the nut 27 and a stepped portion 93*c* of the piston rod 93 by fastening the nut 27 to an end portion at the one side of the piston rod 93.

The first flow path 121 is formed in a central portion of the piston 92 and is formed at a position outside a central hole 92*a* through which the piston rod 93 passes. A plurality of first flow paths 121 are formed at equal intervals in the circumferential direction.

The second flow path 122 is formed at a position outside the first flow path 121. A plurality of second flow paths 122 are formed at equal intervals in the circumferential direction. An inner diameter of the second flow path 122 is smaller than an inner diameter of the first flow path 121.

The first valve 131 is formed by stacking a plurality of annular disk valves. An inner diameter of the first valve 131 is larger than an outer diameter of the piston rod 93, and the first valve 131 is disposed to surround the piston rod 93.

The second valve 132 is a single annular disk valve. An inner diameter of the second valve 132 is larger than an outer diameter of the first valve 131, and the second valve 132 is disposed outside the first valve 131. The second valve 132 is disposed to surround the first valve 131.

The first valve 131 disposed to close an opening portion at the other side of the first flow path 121 and the second valve 132 disposed to close an opening portion at the other side of the second flow path are both disposed at an end portion at the other side (a second end portion side) of the piston 92.

The piston 92 has an annular support surface 92*b* which supports the first valve 131 around the central hole 92*a*. The piston 92 has an annular support surface 92*c* which supports an outer end portion of the first valve 131 between the first flow path 121 and the second flow path 122. The support surface 92*c* also supports an inner end portion of the second valve 132. The piston 92 has an annular support surface 92*d* which supports an outer end portion of the second valve 132 at an outer side from the second flow path 122. The piston 92 has an outer wall 92*e* which protrudes to the other side from the support surface 92*d* around the support surface 92*d*. The outer wall 92*e* prevents a movement of the second valve 132 in the radial direction. The outer wall 92*e* is formed with a through hole 92*f* which passes through the outer wall 92*e* in the radial direction.

The nut 27 is a cylindrical member formed, on an inner circumferential surface of the nut 27, with a female screw which engages with a male screw formed at an end portion at the one side of the piston rod 93. An outer diameter of the nut 27 is set such that the nut 27 is disposed at an inner side from the first flow path 121 and opening portions at the one side of the first flow path 121 and the second flow path 122 are opened.

[First Adjustment Unit 140]

The first adjustment unit 140 includes a first spring 141 which is a coil spring and applies a force in a closing direction to the first valve 131, and a first spring receiver 142 which supports an end portion 141*b* at the other side of the first spring 141. The first adjustment unit 140 includes a support member 143 which is disposed between the first valve 131 and the first spring 141 and supports an end portion at the one side of the first spring 141. The first adjustment unit 140 includes a first adjustment portion 150 which adjusts a position of the first spring receiver 142 in the axial direction.

The first spring receiver 142 is a member in which a central hole 142*a* is formed in a central portion of the first spring receiver 142. A diameter of the central hole 142*a* is larger than an outer diameter of the collar 182, and the first spring receiver 142 is disposed to surround the collar 182.

The first spring receiver 142 includes a support portion 142*b* which supports an end portion at the other side of the first spring 141, a receiving portion 142*c* which receives an axial force transmitted via a first transmission member 151 to be described later, and a connection portion 142*d* which connects the support portion 142*b* and the receiving portion 142*c*.

The support portion 142*b* is an annular portion. A surface at the one side of the support portion 142*b* is formed to such a shape in which an inner diameter of the surface is smaller than an inner diameter of the first spring 141 and an outer diameter of the surface is larger than an outer diameter of the first spring 141. The surface at the one side of the support portion 142*b* is in contact with the first spring 141.

The receiving portion 142*c* is an annular portion provided inward from the support portion 142*b* and provided at the one side. An outer diameter of a surface at the other side of the receiving portion 142*c* is equal to or larger than an outer diameter of the first transmission member 151.

The connection portion 142*d* is a cylindrical portion having an inner diameter and an outer diameter which gradually increase from the one side toward the other side. The connection portion 142*d* prevents a movement in the radial direction of the first spring 141 which is disposed to surround the connection portion 142*d*, and prevents a movement in the radial direction of the first transmission member 151 which is disposed inward of the connection portion 142*d*.

The support member 143 is an annular member in which a central hole 143*a* is formed in a central portion of the support member 143. A diameter of the central hole 143*a* is larger than an outer diameter of the collar 182, and the support member 143 is disposed to surround the collar 182. An outer diameter of the support member 143 is larger than an outer diameter of the first spring 141, and an end portion at the one side of the first spring 141 is in contact with the support member 143.

An outermost diameter portion of the support member 143 is provided with an application portion 143*b* which protrudes in a cylindrical shape from an end surface at the one side to the one side and applies a force to the first valve 131. An inner side of the support member 143 is provided with a prevention portion 143*c* which protrudes in a cylindrical shape from an end surface at the other side to the other side and prevents a movement in a radial direction of the first spring 141.

An inner diameter of the application portion 143*b* is smaller than an outer diameter of the first valve 131. The application portion 143*b* is in contact with the outermost diameter portion of the first valve 131 and applies a spring force of the first spring 141 to the first valve 131. Since a magnitude of a force transmitted to the first valve 131 via the application portion 143*b* can be adjusted by adjusting a spring force of the first spring 141, a force required to open the first valve 131 can be adjusted.

An outer diameter of the prevention portion 143*c* is smaller than an inner diameter of the first spring 141, and the prevention portion 143*c* is disposed inside the first spring 141.

The first adjustment portion 150 includes the first transmission member 151 which transmits an axial force to the first spring receiver 142, and a plate-shaped member 152 which is disposed between the first transmission member 151 and the first spring receiver 142. The first adjustment portion 150 further includes a holding member 153 which holds the first transmission member 151 and is separate from the first transmission member 151, and a first operation portion 155 which can change a position of the first transmission member 151 in the axial direction by a rotation operation, and thus can also change a position of the first spring receiver 142 in the axial direction.

The first transmission member 151 is an annular member in which a central hole 151*a* is formed in a central portion of the first transmission member 151. An outer diameter of the first transmission member 151 is larger than an outer diameter of the collar 182 and is equal to or smaller than an inner diameter at the other side of the connection portion 142*d* of the first spring receiver 142. As illustrated in FIG. 6, the first transmission member 151 communicates with the communication hole 93*a* formed in the piston rod 93.

The plate-shaped member 152 is an annular member in which a central hole 152*a* is formed in a central portion of the plate-shaped member 152. A diameter of the central hole 152*a* is larger than an outer diameter of the collar 182, and the plate-shaped member 152 is disposed to surround the collar 182. An outer diameter of the plate-shaped member 152 is equal to or smaller than an outer diameter of a surface at the other side of the receiving portion 142c of the first spring receiver 142. The plate-shaped member 152 is disposed inside the connection portion 142d of the first spring receiver 142.

The holding member 153 includes a first portion 153a, a second portion 153b, a third portion 153c, and a fourth portion 153d in this order from the one side to the other side. The first portion 153a, the second portion 153b, the third portion 153c, and the fourth portion 153d are four columnar portions located at different positions in the axial direction.

A diameter of the first portion 153a is smaller than a diameter of the central hole 151a of the first transmission member 151, and a diameter of the second portion 153b is larger than a diameter of the central hole 151a of the first transmission member 151. An end portion at the one side of the first portion 153a is formed with a male screw which engages with a female screw formed at the closing member 183. Accordingly, the first transmission member 151 is disposed outside the first portion 153a, is disposed at the one side of the second portion 153b, and is interposed between the second portion 153b and the closing member 183.

A diameter of the second portion 153b is smaller than a diameter of a central hole 171a of the second transmission member 171, and the second portion 153b is inserted into the central hole 171a of the second transmission member 171.

The third portion 153c is provided at the other side of the second portion 153b, and the fourth portion 153d is provided at the other side of the third portion 153c. A protruding portion 153e which protrudes from the outer circumferential surface across the entire circumference is provided between the third portion 153c and the fourth portion 153d. Further, the holding member 153 includes a seal ring 153f fitted into a groove which is recessed from an outer circumferential surface of the protruding portion 153e.

As illustrated in FIG. 5, an end portion at the other side of the fourth portion 153d is formed into a curved surface shape.

The first operation portion 155 includes a first base 156 fitted into the through hole 95a of the mounting member 95, and a first adjuster 157 which is rotationally operated from the outside. The first operation portion 155 which is an operation portion extending in the radial direction includes a first positioning member 158 which determines a position of the holding member 153 in the axial direction when the first positioning member 158 is moved in the cylinder 11 in the radial direction due to an operation of the first adjuster 157, and a pin 159 inserted into the first positioning member 158.

The first base 156 is a cylindrical member in which a central hole 156a is formed in a central portion of the first base 156. The first base 156 is formed with, at equal intervals in the circumferential direction, a plurality of communication holes 156b which allows the central hole 156a and an outer side of the first base 156 to communicate with each other. A portion inside the first base 156 is formed with a female screw 156c which engages with a male screw 158c formed at the first positioning member 158.

The first adjuster 157 is a columnar member and is inserted into the central hole 156a of the first base 156. The first adjuster 157 has a columnar portion 157a protruding into a columnar shape from an inner end portion to an inner side. The first adjuster 157 has a coil spring inserted into a recessed portion formed in the axial direction. The first adjuster 157 includes a fitting member 157b which is supported by the coil spring and is fitted into the communication hole 156b when the coil spring protrudes from an outer circumferential surface, for example, in a case where the coil spring has a free length. The first adjuster 157 has a seal ring 157c which is fitted in a groove recessed from an outer circumferential surface of the first adjuster 157. The first adjuster 157 is formed with an operation groove 157d which is recessed from an outer end surface to an inner side.

The first positioning member 158 has a base portion 158a having a columnar shape and a tip end portion 158b having a truncated cone shape.

An outer circumferential surface of the base portion 158a is formed with the male screw 158c which engages with the female screw 156c formed at the first base 156. An outer end surface of the base portion 158a is formed with a groove 158d recessed inward in a columnar shape. The columnar portion 157a of the first adjuster 157 is fitted into the groove 158d.

The first positioning member 158 is formed with a hole 158e which passes through the base portion 158a and the tip end portion 158b in the radial direction. The pin 159 is inserted into the hole 158e.

[Second Adjustment Unit 160]

The second adjustment unit 160 includes a second spring 161 which is a coil spring applying a force in a closing direction to the second valve 132, a second spring receiver 162 which supports an end portion 161b at the other side (a second end portion side) of the second spring 161, and a second adjustment portion 170 which adjusts a position of the second spring receiver 162 in the axial direction.

The second spring 161 is disposed coaxially with the first spring 141. In other words, the second spring 161 is disposed to surround the first spring 141. In the second damping force generating device 100, the second valve 132 is disposed to surround the first valve 131, and the second spring 161 is disposed to surround the first spring 141. Accordingly, it is easy to reduce a size of the second damping force generating device 100.

The second spring receiver 162 is a member in which a central hole 162a is formed in a central portion of the second spring receiver 162. A diameter of the central hole 162a is larger than an outer diameter of the collar 182, and the second spring receiver 162 is disposed to surround the collar 182.

The second spring receiver 162 includes a support portion 162b which supports an end portion at the other side of the second spring 161, a receiving portion 162c which receives an axial force transmitted via the second transmission member 171 to be described later, and a connection portion 162d which connects the support portion 162b and the receiving portion 162c.

The support portion 162b is an annular portion. A surface at the one side of the support portion 162b is formed to such a shape in which an inner diameter of the surface is smaller than an inner diameter of the second spring 161 and an outer diameter of the surface is larger than an outer diameter of the second spring 161. The surface at the one side of the support portion 162b is in contact with the second spring 161.

The receiving portion 162c is an annular portion provided inward from the support portion 162b and provided at the one side. An outer diameter of a surface at the other side of the receiving portion 162c is equal to or larger than an outer diameter of the second transmission member 171.

The connection portion 162d is a cylindrical portion having an inner diameter and an outer diameter which gradually increase from the one side toward the other side. The connection portion 162d prevents a movement in the radial direction of the second spring 161 which is disposed to surround the connection portion 162d, and prevents a movement in the radial direction of the second transmission member 171 which is disposed inward of the connection portion 162d.

The second adjustment portion 170 includes the second transmission member 171 which transmits an axial force to the second spring receiver 162, and a plate-shaped member 172 which is disposed between the second transmission member 171 and the second spring receiver 162. The second adjustment portion 170 further includes a contact member 173 which is in contact with the second transmission member 171 and is a separate member from the second transmission member 171, and a second operation portion 175 which can change a position of the second transmission member 171 in the axial direction by a rotation operation, and thus can also change a position of the second spring receiver 162 in the axial direction.

The second transmission member 171 is an annular member in which the central hole 171a is formed in a central portion of the second transmission member 171. An outer diameter of the second transmission member 171 is larger than an outer diameter of the collar 182 and is equal to or smaller than an inner diameter of a surface at the other side of the connection portion 162d of the second spring receiver 162. As illustrated in FIG. 6, the second transmission member 171 communicates with the communication hole 93a formed in the piston rod 93.

The plate-shaped member 172 is an annular member in which a central hole 172a is formed in a central portion of the plate-shaped member 172. A diameter of the central hole 172a is larger than an outer diameter of the collar 182, and the plate-shaped member 172 is disposed to surround the collar 182. An outer diameter of the plate-shaped member 172 is equal to or smaller than an outer diameter of a surface at the other side of the receiving portion 162c of the second spring receiver 162. The plate-shaped member 172 is disposed inside the connection portion 162d of the second spring receiver 162.

The contact member 173 includes a first portion 173a, a second portion 173b, a third portion 173c, and a fourth portion 173d in this order from the one side to the other side. The first portion 153a, the second portion 153b, the third portion 153c, and the fourth portion 153d are four cylindrical portions located at different positions in the axial direction. The contact member 173 is disposed inside the piston rod 93 and is disposed to surround the holding member 153 of the first adjustment portion 150.

An inner diameter of the first portion 173a is larger than an outer diameter of the second portion 153b of the holding member 153, and a part of the second portion 153b is inserted into the first portion 173a.

An inner diameter of the second portion 173b is larger than an outer diameter of the protruding portion 153e provided at the third portion 153c, and the third portion 153c, a part of the fourth portion 153d, and the protruding portion 153e are inserted into the second portion 173b. Then, the seal ring 153f fitted into the protruding portion 153e seals a gap between the contact member 173 and the holding member 153. The inner diameter of the second portion 173b is smaller than the outer diameter of the second portion 153b of the holding member 153, and the second portion 153b is prevented from moving to the other side.

An inner diameter of the third portion 173c is larger than an outer diameter of the fourth portion 153d, and the fourth portion 153d is inserted into the third portion 173c. The inner diameter of the third portion 173c is smaller than an outer diameter of the protruding portion 153e, and the protruding portion 153e is prevented from moving to the other side.

As illustrated in FIG. 5, an inner diameter of the fourth portion 173d is larger than an outer diameter of the fourth portion 153d, and the fourth portion 153d is inserted into the third portion 173c and the fourth portion 173d. A seal ring 173e is fitted into a groove which is recessed from an outer circumferential surface of the fourth portion 173d. The seal ring 173e seals a gap between the contact member 173 and an inner circumferential surface of the piston rod 93. A protruding portion 173f which protrudes to the other side is provided at an end portion at the other side of the fourth portion 173d at a portion close to a side where the second operation portion 175 is disposed. A tip end of the protruding portion 173f is chamfered to have a chamfered portion 173g so that a distance from a center line is gradually reduced from the one side to the other side.

The second operation portion 175 includes a second base 176 fitted into the through hole 95a of the mounting member 95, and a second adjuster 177 which is rotationally operated from the outside. The second operation portion 175 includes a second positioning member 178 which determines a position of the contact member 173 in the axial direction when the second positioning member 178 is moved in the radial direction due to an operation of the second adjuster 177. Similar to the first operation portion 155, the second operation portion 175 is an operation portion extending in the radial direction. The first operation portion 155 and the second operation portion 175 are coaxially disposed at opposite sides across a plane which passes through an axial center of the cylinder 11 and is parallel to the axial direction. With such an arrangement, the second damping force generating device 100 including the first adjustment unit 140 and the second adjustment unit 160 can be reduced in size.

The second base 176 is a cylindrical member in which a central hole 176a is formed in a central portion of the second base 176. The second base 176 is formed with, at equal intervals in the circumferential direction, a plurality of (for example, four) communication holes 176b which allows the central hole 176a and an outer side of the second base 176 to communicate with each other.

The second adjuster 177 is a columnar member and is inserted into the central hole 176a of the second base 176. The second adjuster 177 has a recessed portion 177a which is recessed outward from an inner end portion of the second adjuster 177. The pin 159 is fitted into the recessed portion 177a. The second adjuster 177 includes a fitting member 177b which is supported by a coil spring inserted into a recessed portion formed in the axial direction and which is fitted into the communication hole 176b when the coil spring protrudes from an outer circumferential surface, for example, in a case where the coil spring has a free length. The second adjuster 177 has a seal ring 177c which is fitted into a groove recessed from an outer circumferential surface of the second adjuster 177. The second adjuster 177 is formed with an operation groove 177d which is recessed from an outer end surface to an inner side. A tip end portion of the second adjuster 177 is formed with a male screw 177e which engages with a female screw 178a formed at the second positioning member 178.

The second positioning member 178 is a cylindrical member and is inserted into the through hole 95a of the mounting member 95. An inner circumferential surface of the second positioning member 178 is formed with the female screw 178a which engages with the male screw 177e of the second adjuster 177. A chamfered portion 178b is formed at an inner end portion of the second positioning member 178 at a portion facing the chamfered portion 173g of the fourth portion 173d.

[Function of First Adjustment Unit 140]

In the first adjustment unit 140, when the first adjuster 157 of the first operation portion 155 is rotationally operated from the outside of the mounting member 95, the first positioning member 158 into which the columnar portion 157a is fitted is rotated around the pin 159. Then, the male screw 158c formed at the first positioning member 158 and the female screw 156c formed at the first base 156 engage with each other, so that the first positioning member 158 moves in the radial direction. For example, in a case where the male screw 158c and the female screw 156c are right-handed screws, when the first adjuster 157 is rotated clockwise, the first positioning member 158 moves in a direction away from the fitting member 157b. Then, a position of an end portion at the other side of the fourth portion 153d of the holding member 153 moves to the one side along an outer circumferential surface of the tip end portion 158b of the first positioning member 158. As the holding member 153 moves to the one side in this manner, the first transmission member 151 is pushed to the one side due to the movement of the holding member 153 to the one side, so that the first transmission member 151 moves to the one side and the first spring receiver 142 moves to the one side. As a result, a length of the first spring 141 is shortened, and a first preset load F1 which is a preset load of the first spring 141 is increased. On the other hand, for example, in a case where the male screw 158c and the female screw 156c are right-handed screws, when the first adjuster 157 is rotated counterclockwise, as the first positioning member 158 moves from an inner side to an outer side, the holding member 153 and the first transmission member 151 move to the other side and the first spring receiver 142 moves to the other side. As a result, a length of the first spring 141 is increased, and the first preset load F1 is reduced. Hereinafter, the first preset load F1 at an intermediate value between a minimum value and a maximum value of the changeable length of the first spring 141 may be referred to as a "first reference load F1$b$".

[Function of Second Adjustment Unit 160]

In the second adjustment unit 160, when the second adjuster 177 of the second operation portion 175 is rotationally operated from an outer side of the mounting member 95, the male screw 177e formed at the second adjuster 177 and the female screw 178a formed at the second positioning member 178 engage with each other, so that the second positioning member 178 moves in the radial direction. For example, in a case where the male screw 177e and the female screw 178a are left-handed screws, when the second adjuster 177 is rotated clockwise, the second positioning member 178 moves from an outer side to an inner side. Then, a position of the chamfered portion 173g of the contact member 173 moves to the one side along the chamfered portion 178b of the second positioning member 178. As the contact member 173 moves to the one side in this manner, the second transmission member 171 is pushed to the one side due to the movement of the contact member 173 to the one side, so that the second transmission member 171 moves to the one side and the second spring receiver 162 moves to the one side. As a result, a length of the second spring 161 is shortened, and a second preset load F2 which is a preset load of the second spring 161 is increased. On the other hand, for example, in a case where the male screw 177e and the female screw 178a are left-handed screws, when the second adjuster 177 is rotated counterclockwise, as the second positioning member 178 moves from the inner side to the outer side, the contact member 173 and the second transmission member 171 move to the other side and the second spring receiver 162 moves to the other side. As a result, a length of the second spring 161 is increased, and the second preset load F2 is reduced. Hereinafter, the second preset load F2 at an intermediate value between a minimum value and a maximum value of the changeable length of the second spring 161 may be referred to as a "second reference load F2$b$".

[Function of Second Damping Force Generating Device 100]

In the second damping force generating device 100 having the above-described configuration, a pressure at which the first valve 131 is opened is set to be lower than a pressure at which the second valve 132 is opened.

For example, when preset loads of the first spring 141 and the second spring 161 are respectively the first reference load F1$b$ and the second reference load F2$b$, the first valve 131 opens the first flow path 121 when a pressure Ps of the oil chamber S1 at the piston side is equal to or higher than a predetermined first pressure P1. The second valve 132 opens the second flow path 122 when the pressure Ps is equal to or higher than a predetermined second pressure P2 (>the first pressure P1).

Here, in a case where a pressure receiving area of the first valve 131 which receives the pressure Ps is A1, the first valve 131 is opened when a value obtained by multiplying the pressure Ps by the pressure receiving area A1 is larger than the first preset load F1 (Ps×A1>F1). In a case where a pressure receiving area of the second valve 132 which receives the pressure Ps is A2, the second valve 132 is opened when a value obtained by multiplying the pressure Ps by the pressure receiving area A2 is larger than the second preset load F2 (Ps×A2>F2). Therefore, in the shock absorber 1, since P1×A1=F1$b$, P2×A2=F2$b$, and P2>P1, F2$b$/A2>F1$b$/A1.

More specifically, the pressure receiving area A1 of the first valve 131 is set to be larger than the pressure receiving area A2 of the second valve 132 (A1>A2). A minimum value F2min of the second preset load F2 is set to be larger than a maximum value F1max of the first preset load F1.

In order to satisfy A1>A2, a multiplication value of a flow path area of the first flow path 121 (a cross-sectional area of the first flow path 121 when the first flow path 121 is cut along a plane orthogonal to the axial direction) and the number of the first flow paths 121 is set to be larger than a multiplication value of a flow path area of the second flow path 122 (a cross-sectional area of the second flow path 122 when the second flow path 122 is cut along a plane orthogonal to the axial direction) and the number of the second flow paths 122.

In order to satisfy F2min>F1max, a wire diameter of the second spring 161 is larger than a wire diameter of the first spring 141.

As long as the pressure at which the second valve 132 is opened is set to be larger than the pressure at which the first valve 131 is opened, flow path areas of the first flow path 121 and the second flow path 122 and specifications of the first spring 141 and the second spring 161 are not limited to those described above.

In the shock absorber 1 according to the present embodiment, when the pressure at which the first valve 131 is opened is adjusted to a lowest level (when the first preset load F1 is adjusted to the minimum value), a pressure at which the valve 65 of the damping force generating device 40 is opened is set to be lower than the pressure at which the first valve 131 is opened.

[Function of Shock Absorber 1]
<Extension Side Stroke>

In an extension side stroke in which the piston 92 moves to a rear wheel side in the cylinder 11 due to an upward and downward movement of the rear wheel, oil in the oil chamber S2 is compressed by the piston 92. Then, the oil in the oil chamber S2 passes through the oil hole 103 formed in a lower end portion of the inner cylinder 20 and flows into the cylindrical annular flow path 101 formed between the inner cylinder 20 and the outer cylinder 21. The oil flowing through the annular flow path 101 passes through the opening portion 104 and communication passage 105 formed in the damper case 15, and is fed into the oil chamber S13 of the damping force generation device 40.

The oil fed into the oil chamber S13 flows into the ports 62t of the piston 62, and push-opens the valve 63 provided at an outlet side of the oil chamber S13, thereby generating a damping force. The oil which push-opens the valve 63 and passes through the valve 63 flows into the oil chamber S12.

A part of the oil fed into the oil chamber S13 flows into the recessed portion 47 from the hole 46h formed in the large diameter portion 46 of the holder member 42. Then, the oil passes through a gap between the valve portion 83v of the adjusting valve 83 and the flow path 85, and flows out to the oil chamber S12 through the flow path 85, the flow path 70 formed at the shaft-shaped portion 45, and the flow path 64h formed at the intermediate member 64. When the oil passes through the gap between the valve portion 83v of the adjusting valve 83 and the flow path 85, a damping force is generated. The adjusting valve 83 is moved forward or backward by the adjuster 84 to adjust the gap between the valve portion 83v of the adjusting valve 83 and the flow path 85, so that the damping force generated when the oil passes through the gap can be adjusted.

In order to compensate for a volume change of the piston rod 93 in the cylinder 11 due to a movement of the piston 92, the oil passes through the communication passage 107 formed at the damper case 15 and flows from the oil reservoir chamber S3 into the oil chamber S12.

The oil which flowed into the oil chamber S12 passes through the port 66t of the piston 66, push-opens the check valve 67, and flows into the oil chamber S11.

The oil in the oil chamber S11 is fed into the oil chamber S1 through the communication passage 102 formed at the damper case 15.

<Compression Side Stroke>

In a compression side stroke in which the piston 92 moves to a vehicle body side in the cylinder 11, the oil in the oil chamber S1 is compressed by the piston 92. Then, the oil in the oil chamber S1 is fed into the oil chamber S11 through the communication passage 102.

The oil fed into the oil chamber S11 flows into the port 66c, push-opens the valve 65 provided at an outlet side, and flows out to the oil chamber S12. When the oil push-opens the valve 65 and the oil passes through the valve 65, a damping force is generated.

A part of the oil in the oil chamber S11 flows into the central hole 48 opened in the one end 42a of the holder member 42, passes through a gap between the valve portion 81v of the adjusting valve 81 and the throttle portion 71, and flows out to the oil chamber S12 via the flow path 70 formed at the shaft-shaped portion 45 and the flow path 64h formed at the intermediate member 64. When the oil passes through the gap between the valve portion 81v of the adjusting valve 81 and the throttle portion 71, a damping force is generated. The adjusting valve 81 is moved forward or backward by the adjuster 82 to adjust the gap between the valve portion 81v and the throttle portion 71, so that the damping force generated when the oil passes through the gap between the valve portion 81v and the throttle portion 71 can be adjusted.

In order to compensate for a volume change of the piston rod 93 in the cylinder 11 due to a movement of the piston 92, a part of the oil which flowed into the oil chamber S12 passes through the communication passage 107 and flows into the oil reservoir chamber S3. The remaining part of the oil which flowed into the oil chamber S12 flows into the port 62c of the piston 62, push-opens the check valve 61, and flows into the oil chamber S13.

The oil which flowed into the oil chamber S13 flows into the oil chamber S2 through the communication passage 105, the annular flow path 101, and the plurality of oil holes 103.

When the pressure Ps in the oil chamber S1 is equal to or higher than the first pressure P1, the second damping force generating device 100 also generates a damping force.

When the pressure Ps is equal to or higher than the first pressure P1 and is lower than the second pressure P2, the oil in the oil chamber S1 push-opens the first valve 131 provided at an end portion at the other side of the first flow path 121, and flows out to the oil chamber S2. When the oil push-opens the first valve 131 and passes through the first valve 131, a damping force is generated.

When the pressure Ps is equal to or higher than the second pressure P2, in addition to the first valve 131, the oil in the oil chamber S1 further push-opens the second valve 132 provided at an end portion at the other side of the second flow path 122, and flows out to the oil chamber S2. When the oil push-opens the second valve 132 and passes through the through hole 92f or the like, a damping force is generated.

Figure 7:
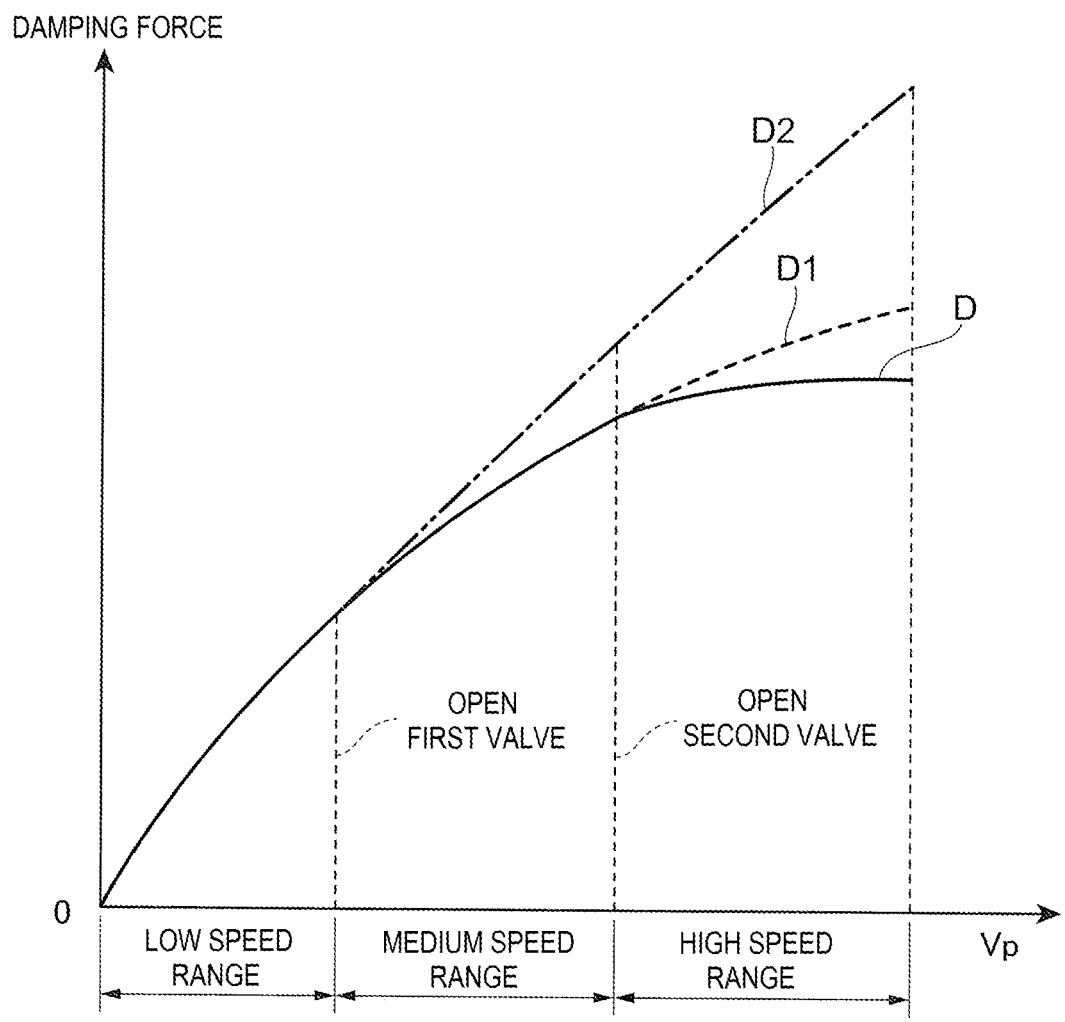
FIG. 7 is a diagram illustrating an example of a relationship between a speed Vp of a piston 92 and a damping force during a compression side stroke.

FIG. 7 is a diagram illustrating an example of a relationship between a speed Vp at which the piston 92 moves in the axial direction and a damping force during the compression side stroke. In FIG. 7, a range of the speed Vp in which a damping force can be adjusted by the damping force generating device 40 without using the second damping force generating device 100 is defined as a "low speed range", a range of the speed Vp in which a damping force can be adjusted by using the first valve 131 is defined as a "medium speed range", and a range of the speed Vp in which a damping force can be adjusted by using the first valve 131 and the second valve 132 is defined as a "high speed range".

Since the pressures at which the first valve 131 and the second valve 132 of the second damping force generation device 100 and the valve 65 of the damping force generating device 40 are opened are set as described above, the relationship between the speed Vp of the piston 92 and the damping force during the compression side stroke is as illustrated in FIG. 7. A damping force D of the shock absorber 1 according to the first embodiment is indicated by a solid line. A damping force D1 of a configuration (hereinafter, may be referred to as a "first comparative configuration") in which the second valve 132 is not opened as compared with the shock absorber 1 is indicated by a dashed line. A damping force D2 of a configuration (hereinafter, may be referred to as a "second comparative configuration") in which the first valve 131 and the second valve 132 are not opened as compared with the shock absorber 1 is indicated by a two-dot chain line.

In the second comparative configuration, no damping force is generated in the second damping force generating device 100, and a damping force corresponding to the speed Vp is generated in the damping force generating device 40.

In the shock absorber 1 and the first comparative configuration, since the first valve 131 of the second damping force generating device 100 is opened, the damping force D and the damping force D1 are smaller than the damping force D2 at a speed equal to or higher than the speed Vp at which the pressure Ps is equal to a pressure at which the first valve 131 is opened.

In the shock absorber 1, the first valve 131 and the second valve 132 of the second damping force generating device 100 are opened at a speed equal to or higher than the speed Vp at which the pressure Ps is equal to a pressure at which the second valve 132 is opened. Therefore, the damping force D is smaller than the damping force D1 and the damping force D2 at a speed equal to or higher than the speed Vp.

Therefore, according to the shock absorber 1, ride comfort in the high speed range in which the speed Vp is high and the first valve 131 and the second valve 132 of the second damping force generating device 100 are opened can be improved compared with the ride comfort in the first comparative configuration and the second comparative configuration. According to the shock absorber 1, ride comfort in the medium speed range in which the speed Vp is high, the second valve 132 of the second damping force generating device 100 is not opened, and the first valve 131 is opened can be improved compared with the ride comfort in the second comparative configuration.

Since the shock absorber 1 includes the first adjustment unit 140 and the second adjustment unit 160, the damping force D in the medium speed range and the high speed range can be adjusted.

For example, the ride comfort in the low speed range and the medium speed range is good but the ride comfort in the high speed range is poor in the second comparative configuration. In this case, it is conceivable to change specifications of the valve 65 or the like in the damping force generating device 40 in order to improve the ride comfort in the high speed range. However, when the valve specifications of the damping force generating device 40 are changed in order to improve the ride comfort in the high speed range, damping characteristics in the low speed range and the medium speed range also change. Therefore, in the second comparative configuration, when the valve specifications are changed in order to improve the ride comfort in the high speed range, the ride comfort in the low speed range and the medium speed range may deteriorate.

On the other hand, since the shock absorber 1 includes the second damping force generating device 100, each of the damping force in the medium speed range and the damping force in the high speed range can be adjusted independently of the adjustment of the damping force in the low speed range in which the damping force is adjusted using the damping force generating device 40. Therefore, according to the shock absorber 1, the damping force can be adjusted in a large moving speed range (large Vp range) of the piston compared with the second comparative configuration in which the damping forces in the low speed range, the medium speed range, and the high speed range cannot be independently controlled.

Second Embodiment

Figure 8:
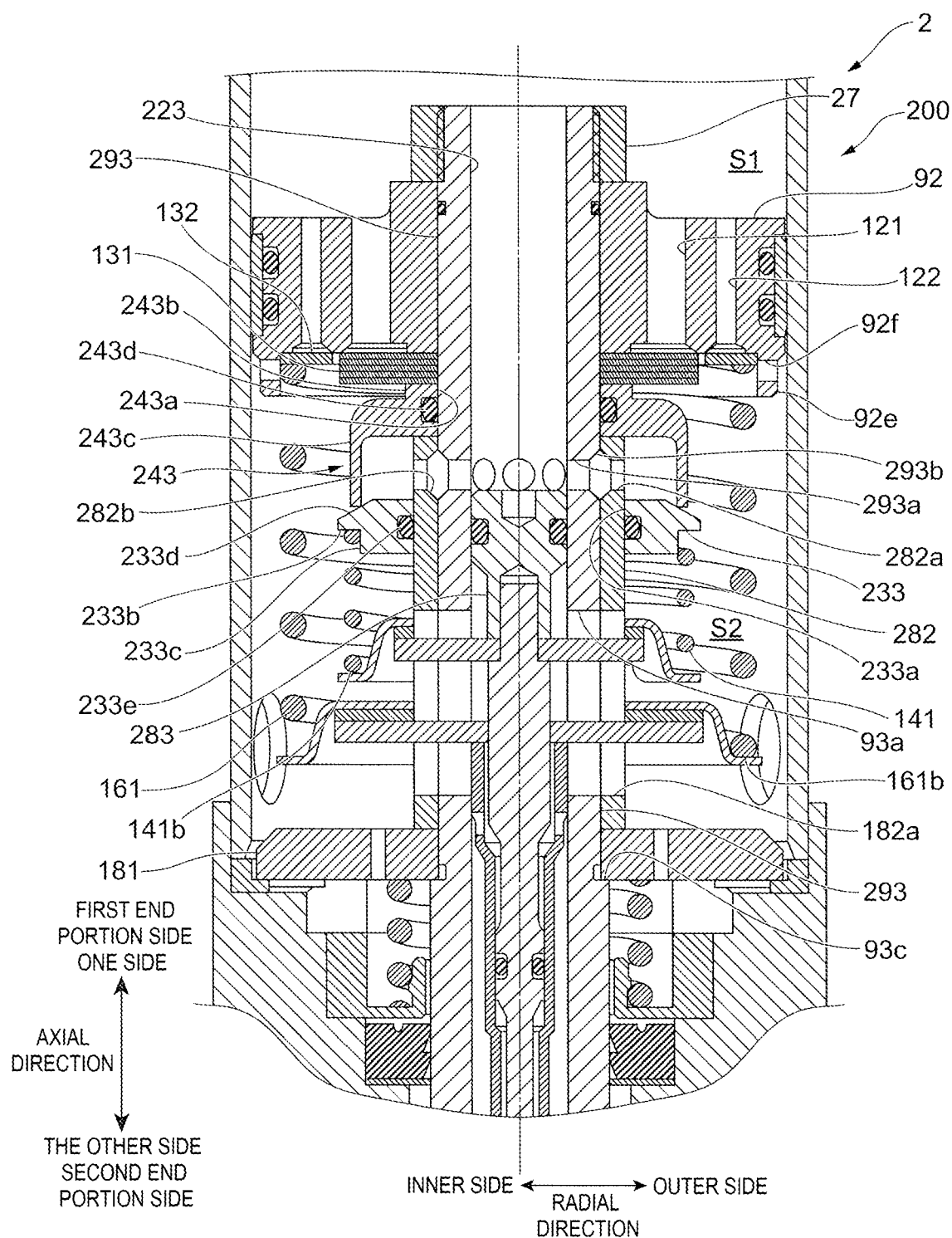
FIG. 8 is a diagram illustrating an example of a schematic configuration of a shock absorber 2 according to a second embodiment.

FIG. 8 is a diagram illustrating an example of a schematic configuration of a shock absorber 2 according to a second embodiment.

The shock absorber 2 is different from the shock absorber 1 in that the shock absorber 2 includes a second damping force generating device 200 instead of the second damping force generating device 100. Hereinafter, differences of the second damping force generating device 200 from the second damping force generating device 100 will be described. Components having the same function in the second damping force generating device 200 and the second damping force generating device 100 are denoted by the same reference numerals, and detailed description thereof will be omitted.

The second damping force generating device 200 includes a piston rod 293 instead of the piston rod 93. The piston rod 293 is different from the piston rod 93 in that a plurality of communication holes 293a which allows an inner side and an outer side of the piston rod 293 to communicate with each other are formed in the circumferential direction at the one side from the communication hole 93a, and recessed portions 293b which are recessed inward from an outer circumferential surface are formed in portions where the communication holes 293a are formed.

The second damping force generating device 200 includes a collar 282 instead of the collar 182. The collar 282 is different from the collar 182 in that a plurality of communication holes 282a which allows an inner side and an outer side of the collar 282 to communicate with each other are formed in the circumferential direction at the one side from the communication hole 182a, and recessed portions 282b which are recessed outward from an inner circumferential surface are formed in portions where the communication holes 282a are formed.

The second damping force generating device 200 includes a closing member 283 instead of the closing member 183. The closing member 283 is smaller in size in the axial direction than the closing member 183, and is disposed at the other side from the communication hole 293a at an inner side of the piston rod 293.

With the above configuration, the second damping force generating device 200 includes a third flow path 223 through which oil flows from the oil chamber S1 to the oil chamber S2 via the inner side of the piston rod 293, the communication holes 293a and the recessed portions 293b of the piston rod 293, and the communication holes 282a and the recessed portions 282b of the collar 282.

The shock absorber 2 includes a third valve 233 which opens and closes the third flow path 223. In addition, the shock absorber 2 includes a support member 243 which supports the first valve 131 and the third valve 233, instead of the support member 143. The piston 92, the first valve 131, the support member 243, the collar 282, and the limiting member 181 are interposed between the nut 27 and the stepped portion 93c of the piston rod 293 by fastening the nut 27 to an end portion at the one side of the piston rod 293.

The third valve 233 is an annular member in which a central hole 233a is formed in a central portion of the third valve 233. A diameter of the central hole 233a is larger than an outer diameter of the collar 282, and the third valve 233 is disposed to surround the collar 282. The third valve 233 includes a support portion 233b which supports an end portion at the one side of the first spring 141, and a prevention portion 233c which is provided inside the support portion 233b and prevents a movement of the first spring 141 in the radial direction. An outermost diameter portion of a surface at the one side of the third valve 233 is chamfered to have a chamfered portion 233d so that the diameter gradually increases from the one side to the other side. The third valve 233 has a seal ring 233e on an inner circumferential surface of the third valve 233. When the seal ring 233e comes into contact with the outer circumferential surface of the collar 282, the seal ring 233e seals a gap between the inner circumferential surface of the third valve 233 and an outer circumferential surface of the collar 282.

The support member 243 is an annular member in which a central hole 243a formed in a central portion of the support member 243. A diameter of the central hole 243a is larger than an outer diameter of the piston rod 293. The support member 243 is disposed to surround the piston rod 293, and is interposed between the first valve 131 and the collar 282.

The support member 243 includes, at the one side, a cylindrical first support portion 243b which supports the first valve 131, and at the other side, a cylindrical third support portion 243c which supports the third valve 233. An outer diameter of the first support portion 243b is set to a size such that the first support portion 243b comes into contact with the first valve 131 at a position inward from the first flow path 121 of the piston 92. An inner diameter and an outer diameter of the third support portion 243c are set such that the third support portion 243c comes into contact with the chamfered portion 233d of the third valve 233. The support member 243 has a seal ring 243d on an inner circumferential surface of the support member 243. When the seal ring 243d comes into contact with an outer circumferential surface of the piston rod 293, the seal ring 243d seals a gap between the inner circumferential surface of the support member 243 and the outer circumferential surface of the piston rod 293.

In the second damping force generating device 200 having the above-described configuration, a pressure at which the first valve 131 is opened, a pressure at which the second valve 132 is opened, and a pressure at which the third valve 233 is opened are different from one another. In the second damping force generating device 200, for example, the pressure at which the first valve 131 is opened is set to be lower than the pressure at which the third valve 233 is opened, and the pressure at which the third valve 233 is opened is set to be lower than the pressure at which the second valve 132 is opened. The pressure at which the valve 65 of the damping force generating device 40 is opened is set to be lower than the pressure at which the first valve 131 is opened.

For example, in a case where preset loads of the first spring 141 and the second spring 161 are respectively the first reference load F1b and the second reference load F2b, the first valve 131 opens the first flow path 121 when the pressure Ps is equal to or higher than the first pressure P1. The third valve 233 opens the third flow path 223 when the pressure Ps is equal to or higher than a predetermined third pressure P3 (P1<P3<P2). The second valve 132 opens the second flow path 122 when the pressure Ps is equal to or higher than the second pressure P2.

Therefore, in the second damping force generating device 200 set as described above, in the compression side stroke, when the pressure Ps of the oil chamber S1 is equal to or higher than the first pressure P1 and is lower than the third pressure P3, the oil in the oil chamber S1 push-opens the first valve 131 and passes through the first valve 131, thereby generating a damping force.

When the pressure Ps is equal to or higher than the third pressure P3 and is lower than the second pressure P2, the oil in the oil chamber S1 push-opens the third valve 233 and flows out to the oil chamber S2. When the oil push-opens the third valve 233 and passes through the third valve 233, a damping force is generated.

When the pressure Ps is equal to or higher than the second pressure P2, the oil in the oil chamber S1 push-opens the second valve 132 and passes through the through hole 92f and the like, thereby generating a damping force.

Therefore, according to the shock absorber 2, since the damping force in the high speed range in which the speed Vp is high and the first valve 131, the third valve 233, and the second valve 132 of the second damping force generating device 200 are opened can be made smaller than that of the shock absorber 1, the ride comfort can be improved.

According to the first adjustment unit 140, since the pressure at which the third valve 233 is opened can be changed by changing the first preset load F1, the damping force can be finely adjusted. Therefore, the shock absorber 2 can also adjust the damping force over a large moving speed range (large Vp range) of the piston.

Third Embodiment

Figure 9:
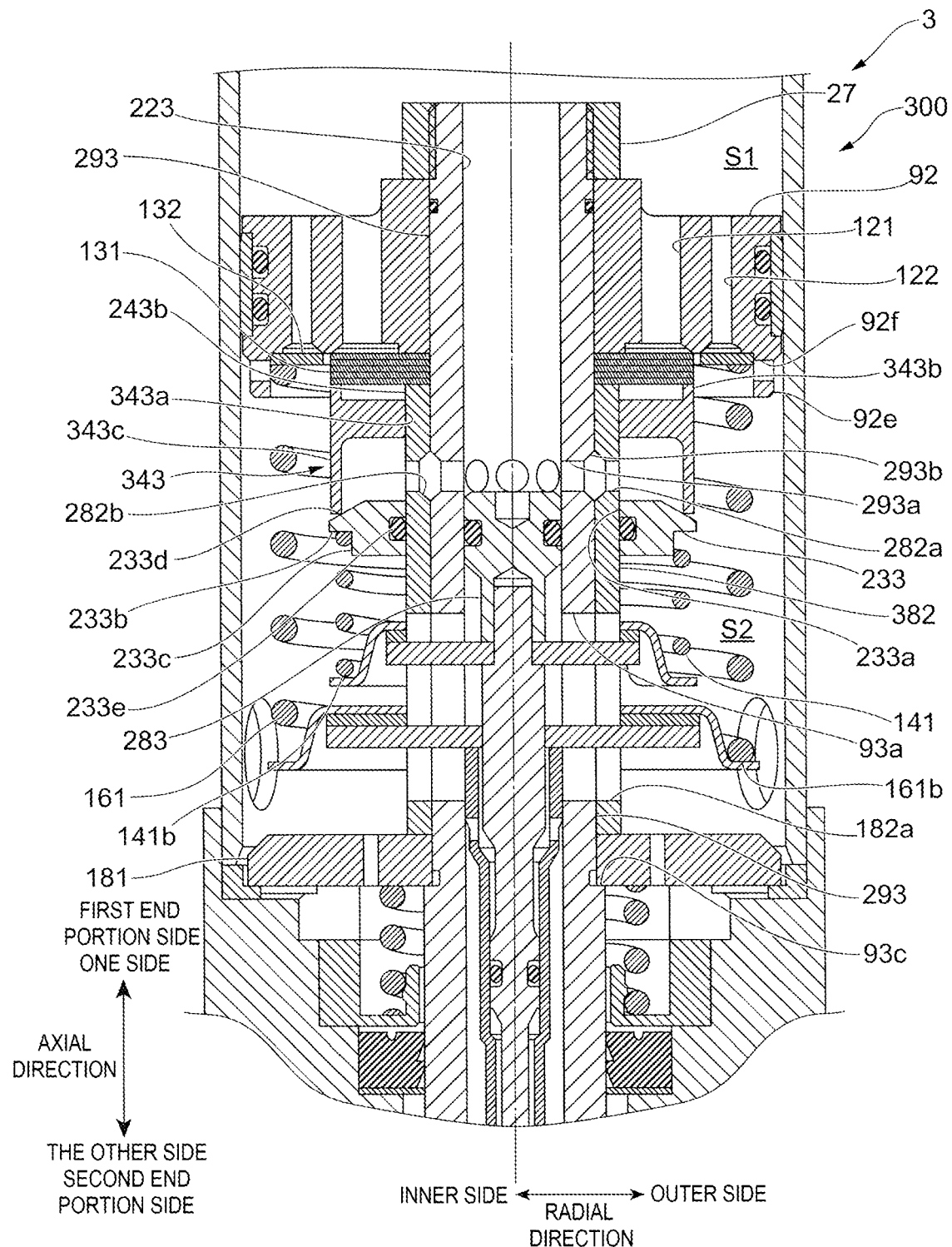
FIG. 9 is a diagram illustrating an example of a schematic configuration of a shock absorber 3 according to a third embodiment.

FIG. 9 is a diagram illustrating an example of a schematic configuration of a shock absorber 3 according to a third embodiment.

The shock absorber 3 according to the third embodiment is different from the shock absorber 2 according to the second embodiment in that the shock absorber 3 includes a second damping force generating device 300 instead of the second damping force generating device 200. Hereinafter, differences of the second damping force generating device 300 from the second damping force generating device 200 will be described. Components having the same functions in the second damping force generation device 300 and the second damping force generation device 200 are denoted by the same reference numerals, and detailed description thereof will be omitted.

The second damping force generating device 300 includes a support member 343 instead of the support member 243. The second damping force generating device 300 includes a collar 382 instead of the collar 282.

A size of the collar 382 in the axial direction is larger than that of the collar 282.

The support member 343 is an annular member in which a central hole 343a is formed in a central portion of the support member 343. A diameter of the central hole 343a is larger than an outer diameter of the collar 382, and the support member 343 is disposed to surround the collar 382. An end surface at the other side of the support member 343 is in contact with the chamfered portion 233d.

An application portion 343b which is an annular convex portion and applies a force to the outermost diameter portion of the first valve 131 is provided at an outermost diameter portion at the one side of the support member 343. A third support portion 343c which is an annular convex portion and supports the third valve 233 is provided at an outermost diameter portion at the other side of the support member 343.

An outer diameter of the application portion 343b is large enough to bring the application portion 343b to come into contact with the outermost diameter portion of the first valve 131, and an inner diameter of the application portion 343b is smaller than an outer diameter of the first valve 131. The application portion 343b comes into contact with the outermost diameter portion of the first valve 131, and transmits a spring force of the first spring 141 transmitted via the third valve 233 to the first valve 131.

An inner diameter and an outer diameter of the third support portion 343c are set such that the third support portion 343c is in contact with the chamfered portion 233d of the third valve 233.

In the second damping force generating device 300 having the above-described configuration, similar to the second damping force generating device 200, a pressure at which the first valve 131 is opened, a pressure at which the second valve 132 is opened, and a pressure at which the third valve 233 is opened are different from one another. In the second damping force generating device 300, for example, the pressure at which the first valve 131 is opened is set to be lower than the pressure at which the third valve 233 is opened, and the pressure at which the third valve 233 is opened is set to be lower than the pressure at which the second valve 132 is opened. The pressure at which the valve 65 of the damping force generating device 40 is opened is set to be lower than the pressure at which the first valve 131 is opened.

In the second damping force generating device 300 set as described above, in the compression side stroke, when the pressure Ps of the oil chamber S1 is equal to or higher than the first pressure P1 and is lower than the third pressure P3, the oil in the oil chamber S1 push-opens the first valve 131 and passes through the first valve 131, thereby generating a damping force.

When the pressure Ps is equal to or higher than the third pressure P3 and is lower than the second pressure P2, the oil in the oil chamber S1 push-opens the third valve 233 and flows out to the oil chamber S2. When the oil push-opens the third valve 233 and passes through the third valve 233, a damping force is generated.

When the pressure Ps is equal to or higher than the second pressure P2, the oil in the oil chamber S1 push-opens the second valve 132 and passes through the through hole 92f and the like, thereby generating a damping force.

Therefore, according to the shock absorber 3, since the damping force in the high speed range in which the speed Vp is high and the first valve 131, the third valve 233, and the second valve 132 of the second damping force generating device 300 are opened can be made smaller than that of the shock absorber 1, the ride comfort can be improved.

According to the first adjustment unit 140, since the pressure at which the first valve 131 is opened and the pressure at which the third valve 233 is opened can be changed by changing the first preset load F1. Therefore, the shock absorber 3 can also adjust the damping force over a large moving speed range (large Vp range) of the piston.

The invention claimed is:

1. A shock absorber which is provided between a vehicle body and a rear wheel of a saddle-type vehicle, the shock absorber comprising:
    a first damping force generating portion which is fixed to a first end portion of a cylinder in an axial direction thereof; and
    a second damping force generating portion which is disposed to be movable in the axial direction in the cylinder,
    wherein the cylinder includes an inner cylinder and an outer cylinder,
    wherein an upper end portion of the inner cylinder and an upper end portion of the outer cylinder are inserted into and held in a damper case,
    wherein one end of a first communication passage is formed to be opened in the damper case at a position facing an opening of the upper end portion of the inner cylinder, and the first communication passage allows an oil chamber at a first end portion side which is an inner space of the inner cylinder and an oil chamber of the first damping force generating portion to communicate with each other,
    wherein an opening portion is formed in the damper case, a second communication passage is formed in continuous communication with the opening portion, and the second communication passage allows an oil chamber of the first damping force generating portion and an annular flow path to communicate with each other, the oil chamber of the first damping force generating portion being different from the oil chamber at the first end portion side, the annular flow path being a flow path between the inner cylinder and the outer cylinder, and
    wherein the second damping force generating portion includes:
        a first flow path which passes through a piston in the axial direction, the piston partitioning a space inside the cylinder;
        a first valve which opens and closes the first flow path;
        a first adjustment unit which adjusts a force required to open the first valve;
        a second flow path which is located at an outer side in a radial direction of the cylinder from the first flow path, passes through the piston in the axial direction, and has an inner diameter smaller than that of the first flow path;
        a second valve which opens and closes the second flow path; and
        a second adjustment unit which adjusts a force required to open the second valve.

2. The shock absorber according to claim 1,
    wherein the first end portion of the cylinder is disposed at a vehicle body side,
    wherein the shock absorber further comprises:
        a rod which holds the piston at an end portion of the rod at a first end portion side, an end portion of the rod at a second end portion side being disposed at a wheel side, the second end portion side being an opposite side to the first end portion in the axial direction of the cylinder,
    wherein the first valve opens and closes an opening portion at the second end portion side of the first flow path, and
    wherein the second valve opens and closes an opening portion of the second flow path at the second end portion side.

3. The shock absorber according to claim 2,
    wherein the first valve opens the first flow path when a pressure of the oil chamber at the first end portion side is equal to or higher than a first pressure, and
    wherein the second valve opens the second flow path when the pressure of the oil chamber at the first end portion side is equal to or higher than a second pressure which is higher than the first pressure.

4. The shock absorber according to claim 3,
    wherein the first damping force generating portion generates a damping force even when the pressure of the oil chamber at the first end portion side is lower than the first pressure.

5. The shock absorber according to claim 4,
    wherein the first adjustment unit includes:
        a first spring which applies a force in a closing direction to the first valve;
        a first spring receiver which supports an end portion at the second end portion side of the first spring, the second end portion side being disposed at an opposite side to the first end portion in the axial direction of the cylinder;
        a first adjustment portion which adjusts a position of the first spring receiver, and wherein the second adjustment unit includes:
- a second spring which applies a force in a closing direction to the second valve;
- a second spring receiver which supports an end portion at the second end portion side of the second spring; and
- a second adjustment portion which adjusts a position of the second spring receiver.

6. The shock absorber according to claim 4, wherein the second damping force generating portion further includes:
- a third flow path which passes through a rod holding the piston; and
- a third valve which opens and closes the third flow path.

7. The shock absorber according to claim 3, wherein the first adjustment unit includes:
- a first spring which applies a force in a closing direction to the first valve;
- a first spring receiver which supports an end portion at the second end portion side of the first spring, the second end portion side being disposed at an opposite side to the first end portion in the axial direction of the cylinder;
- a first adjustment portion which adjusts a position of the first spring receiver, and wherein the second adjustment unit includes:
- a second spring which applies a force in a closing direction to the second valve;
- a second spring receiver which supports an end portion at the second end portion side of the second spring; and
- a second adjustment portion which adjusts a position of the second spring receiver.

8. The shock absorber according to claim 3, wherein the second damping force generating portion further includes:
- a third flow path which passes through a rod holding the piston; and
- a third valve which opens and closes the third flow path.

9. The shock absorber according to claim 2, wherein the first adjustment unit includes:
- a first spring which applies a force in a closing direction to the first valve;
- a first spring receiver which supports an end portion at the second end portion side of the first spring, the second end portion side being disposed at an opposite side to the first end portion in the axial direction of the cylinder;
- a first adjustment portion which adjusts a position of the first spring receiver, and wherein the second adjustment unit includes:
- a second spring which applies a force in a closing direction to the second valve;
- a second spring receiver which supports an end portion at the second end portion side of the second spring; and
- a second adjustment portion which adjusts a position of the second spring receiver.

10. The shock absorber according to claim 2, wherein the second damping force generating portion further includes:
- a third flow path which passes through a rod holding the piston; and
- a third valve which opens and closes the third flow path.

11. The shock absorber according to claim 1, wherein the first adjustment unit includes:
- a first spring which applies a force in a closing direction to the first valve;
- a first spring receiver which supports an end portion at the second end portion side of the first spring, the second end portion side being disposed at an opposite side to the first end portion in the axial direction of the cylinder;
- a first adjustment portion which adjusts a position of the first spring receiver, and wherein the second adjustment unit includes:
- a second spring which applies a force in a closing direction to the second valve;
- a second spring receiver which supports an end portion at the second end portion side of the second spring; and
- a second adjustment portion which adjusts a position of the second spring receiver.

12. The shock absorber according to claim 11, wherein the second spring is disposed to surround the first spring.

13. The shock absorber according to claim 12, wherein the second damping force generating portion further includes:
- a third flow path which passes through a rod holding the piston; and
- a third valve which opens and closes the third flow path.

14. The shock absorber according to claim 11, wherein the second damping force generating portion further includes:
- a third flow path which passes through a rod holding the piston; and
- a third valve which opens and closes the third flow path.

15. The shock absorber according to claim 1, wherein the second damping force generating portion further includes:
- a third flow path which passes through a rod holding the piston; and
- a third valve which opens and closes the third flow path.

16. The shock absorber according to claim 15, wherein the first adjustment unit adjusts a force required to open the first valve and a force required to open the third valve.

17. A saddle-type vehicle comprising:
- a vehicle body;
- a front wheel disposed at a front side of the vehicle body in a traveling direction;
- a rear wheel disposed at a rear side in the traveling direction;
- a first shock absorber disposed between the vehicle body and the front wheel; and
- a second shock absorber disposed between the vehicle body and the rear wheel, wherein at least the second shock absorber is the shock absorber according to claim 1.

18. A shock absorber which is provided between a vehicle body and a rear wheel of a saddle-type vehicle, the shock absorber comprising:
- a first damping force generating portion which is fixed to a first end portion of a cylinder in an axial direction thereof; and a second damping force generating portion which is disposed to be movable in the axial direction in the cylinder, wherein the cylinder includes an inner cylinder and an outer cylinder, wherein an upper end portion of the inner cylinder and an upper end portion of the outer cylinder are inserted into and held in a damper case, wherein one end of a first communication passage is formed to be opened in the damper case at a position facing an opening of the upper end portion of the inner cylinder, and the first communication passage allows an oil chamber at a first end portion side which is an inner space of the inner cylinder and an oil chamber of the first damping force generating portion to communicate with each other, wherein an opening portion is formed in the damper case, a second communication passage is formed in continuous communication with the opening portion, and the second communication passage allows an oil chamber of the first damping force generating portion and an annular flow path to communicate with each other, the oil chamber of the first damping force generating portion being different from the oil chamber at the first end portion side, the annular flow path being a flow path between the inner cylinder and the outer cylinder, and wherein the second damping force generating portion includes:
- a first flow path which passes through a piston in the axial direction of the piston partitioning a space inside the cylinder;
- a first valve which opens and closes the first flow path;
- a second flow path which is located at an outer side in a radial direction of the cylinder from the first flow path, passes through the piston in the axial direction, and has an inner diameter smaller than that of the first flow path;
- a second valve which opens and closes the second flow path;
- a third flow path which passes through a rod which holds the piston;
- a third valve which opens and closes the third flow path;
- a first adjustment unit which adjusts a force required to open the third valve; and
- a second adjustment unit which adjusts a force required to open the second valve.

19. The shock absorber according to claim 18,
wherein the first end portion of the cylinder is disposed at a vehicle body side,
wherein the rod holds the piston at an end portion of the rod at a first end portion side, and an end portion of the rod at a second end portion side is disposed at a wheel side, the second end portion side being an opposite side to the first end portion in the axial direction of the cylinder,
wherein the first valve opens and closes an opening portion of the first flow path at the second end portion side,
wherein the second valve opens and closes an opening portion of the second flow path at the second end portion side, and
wherein the third valve opens and closes an opening portion of the third flow path at the second end portion side.

20. The shock absorber according to claim 19,
wherein the first valve opens the first flow path when a pressure of the oil chamber at the first end portion side is equal to or higher than a first pressure, and
wherein the second valve opens the second flow path when the pressure of the oil chamber at the first end portion side is equal to or higher than a second pressure which is higher than the first pressure.

* * * * *